(12) United States Patent
Johnson et al.

(10) Patent No.: US 7,246,973 B2
(45) Date of Patent: *Jul. 24, 2007

(54) TANGENTIAL CUTTING INSERT AND MILLING CUTTER

(75) Inventors: William Bennett Johnson, Machesney Park, IL (US); Neil A. Vogeler, Rockford, IL (US)

(73) Assignee: Ingersoll Cutting Tool Company, Rockford, IL (US)

( * ) Notice: Subject to any disclaimer, the term of this patent is extended or adjusted under 35 U.S.C. 154(b) by 14 days.

This patent is subject to a terminal disclaimer.

(21) Appl. No.: 11/460,730

(22) Filed: Jul. 28, 2006

(65) Prior Publication Data

US 2006/0257214 A1 Nov. 16, 2006

Related U.S. Application Data

(63) Continuation of application No. 10/932,293, filed on Sep. 2, 2004, now Pat. No. 7,104,735.

(51) Int. Cl.
*B23C 5/20* (2006.01)
(52) U.S. Cl. ............................ 407/42; 407/48; 407/113
(58) Field of Classification Search ................ 407/42, 407/48, 47, 61, 113, 102, 103, 104, 101; *B23C 5/20*
See application file for complete search history.

(56) References Cited

U.S. PATENT DOCUMENTS

| | | | |
|---|---|---|---|
| 3,142,110 A | 7/1964 | Hertel | |
| 3,490,117 A | 1/1970 | Hertel | |
| 3,694,876 A | 10/1972 | Erkfritz | |
| 3,813,747 A | 6/1974 | Hertel | |
| 4,074,949 A | 2/1978 | Hochmuth et al. | |
| 4,111,589 A | 9/1978 | Goeke | |
| 4,124,326 A | 11/1978 | Cost | |
| 4,294,566 A | 10/1981 | Boone | |
| 4,573,831 A | 3/1986 | Lacey | |
| 4,632,608 A | 12/1986 | Blomberg et al. | |
| 5,046,899 A | 9/1991 | Nishi | |
| 5,333,972 A | 8/1994 | Bernadic et al. | |
| 5,383,750 A | 1/1995 | Satran et al. | |
| 6,074,137 A | 6/2000 | Betman et al. | |

(Continued)

FOREIGN PATENT DOCUMENTS

| | | |
|---|---|---|
| DE | WO 99/17899 | 4/1999 |
| EP | 0769341 B1 | 4/1997 |
| JP | 2001-062624 | 3/2001 |
| WO | WO 96/35536 | 11/1996 |
| WO | WO 97/17157 | 5/1997 |
| WO | WO 03/101655 A1 | 12/2003 |
| WO | WO 2004/050283 A1 | 6/2004 |

*Primary Examiner*—Monica Carter
*Assistant Examiner*—Sara Addisu
(74) *Attorney, Agent, or Firm*—Womble Carlyle

(57) ABSTRACT

A tangential milling cutting insert has two identical opposing end surfaces with two identical opposing major side surfaces of a generally parallelogrammatic shape and two identical opposing minor side surfaces extending between them. An ambidextrous tangential cutting insert has two non-identical end surfaces and two opposing major side surfaces of a generally trapezoidal nature. In either cutting insert, each end surface has a peripheral cutting edge and four corners of which two diagonally opposed corners are lowered and the other two are raised. Each end surface has four separate planar regions arranged in pairs, the planar regions do not protrude relative to the surrounding end surface and the two planar regions of a given pair of planar regions slope in opposite directions with respect to a median plane of the cutting insert.

22 Claims, 19 Drawing Sheets

U.S. PATENT DOCUMENTS

| | | |
|---|---|---|
| 6,109,838 A | 8/2000 | Riviere |
| 6,142,716 A | 11/2000 | Jordberg et al. |
| 6,196,770 B1 | 3/2001 | Astrom et al. |
| 6,227,772 B1 | 5/2001 | Heinloth et al. |
| 6,238,146 B1 | 5/2001 | Satran et al. |
| 6,343,898 B1 | 2/2002 | Sjoo et al. |
| 6,413,021 B1 | 7/2002 | Koch et al. |
| 6,503,028 B1 | 1/2003 | Wallstrom |
| 6,543,970 B1 | 4/2003 | Qvarth et al. |
| 6,872,034 B2 | 3/2005 | Satran et al. |
| 6,921,233 B2 | 7/2005 | Duerr et al. |
| 7,014,396 B2 | 3/2006 | Satran et al. |
| 2003/0113175 A1 | 6/2003 | Wermeister |
| 2003/0170080 A1 | 9/2003 | Hecht |
| 2004/0028486 A1 | 2/2004 | Englund |
| 2004/0202515 A1 | 10/2004 | Satran et al. |
| 2005/0063792 A1 | 3/2005 | Satran |
| 2005/0214081 A1 | 9/2005 | Satran et al. |
| 2006/0045636 A1 | 3/2006 | Johnson et al. |

//!# TANGENTIAL CUTTING INSERT AND MILLING CUTTER

RELATED APPLICATIONS

This is a Continuation of U.S. patent application Ser. No. 10/932,293, filed Sep. 2, 2004, now U.S. Pat. No. 7,104,735. The contents of the aforementioned U.S. patent application Ser. No. 10/932,293 are incorporated by reference in their entirety.

FIELD OF THE INVENTION

The present invention relates to a tangential indexable cutting insert and a milling cutter for use in metal cutting processes in general and for milling a square shoulder in a workpiece in particular.

BACKGROUND OF THE INVENTION

Tangential cutting inserts, also known as on-edge, or lay down, cutting inserts, are oriented in an insert holder in such a manner that during a cutting operation on a workpiece the cutting forces are directed along a major (thicker) dimension of the cutting insert. An advantage of such an arrangement being that the cutting insert can withstand greater cutting forces than when oriented in such a manner that the cutting forces are directed along a minor (thinner) dimension of the cutting insert.

There is disclosed in EP 0 769 341 a face milling cutter employing a double-sided indexable tangential cutting insert having a prismoidal shape with two opposed generally rectangular rake surfaces connected by side surfaces. The cutting insert has a basic "negative" geometry and therefore in order to provide the necessary clearance between the cutting insert and the workpiece, when mounted in a face-mill, the cutting insert is oriented with a negative axial rake angle. However, negative axial rake angles are disadvantageous, e.g., they have been found to be deficient in cutting efficiency for applications involving difficult to machine materials.

A double-sided indexable tangential cutting insert for a boring tool head is disclosed in U.S. Pat. No. 5,333,972. The insert is provided at each end with a protruding flat island. Each long cutting edge is inclined at an angle of 3° relative to the protruding flat island, defining an "insert axial rake angle". Rearward of each cutting edge is a descending land surface that merges with an increasing incident angle surface to form a chip breaker groove. Each increasing incident angle surface extends from its associated descending land surface to an adjacent island, at either the top or the bottom of the cutting insert. The cutting insert is left or right handed. It is manufactured to be right-handed and, when flipped around, is left-handed. It will be appreciated that the magnitude of the insert axial rake angle is limited for practical reasons. Any increase in the insert axial rake angle will result in an increase in the "vertical" extent of the increasing incident angle surface (see FIG. 3 of U.S. Pat. No. 5,333,972) that will have an adverse effect on chip development and evacuation.

There is disclosed in WO 96/35536 a double-sided indexable tangential cutting insert which when mounted in a face-mill has a positive axial rake angle, even when the necessary clearance between the cutting insert and the workpiece is provided. This cutting insert presents two peripheral cutting edges for a right-hand face mill and two peripheral cutting edges for a left-hand face mill. In a side view (see FIG. 9) the cutting insert is generally rhomboidal in shape. The main cutting edges 10 of each end surface are parallel (see also FIGS. 7 and 8) to each other and to a centrally located protruding abutment member 12. The cutting insert is retained in an insert pocket with the abutment member of a non-operative end surface and an adjacent non-operative relief surface in abutment with respective support surfaces of the insert pocket. The abutment member of the non-operative end surface and the adjacent non-operative relief surface merge at an acute-angled mounting corner. In order to change the axial rake angle of the operative cutting edge, either the insert pocket has to be rotated, or a cutting insert having a mounting corner with a different mounting angle has to be used. In either case, a different milling cutter has to be used. Moreover, the axial rake and relief angles are interdependent and any change in the axial relief angle results in a corresponding change in the relief angle, which is not always desirable.

There is disclosed in WO 03/101655 a double-sided indexable tangential cutting insert having two identical opposing end surfaces with two identical opposing major side surfaces and two identical opposing minor side surfaces extending between them. Each end surface has a peripheral edge containing cutting edges and four corners of which two are lowered and two are raised. The cutting insert has four main cutting edges, for a given direction of rotation of the milling cutter, each main cutting edge having a positive axial rake angle when mounted as an operative cutting edge in a milling cutter. Each end surface is provided with at least one projecting abutment member having at least one projecting abutment surface, wherein in a side view of either major side surface, the at least one projecting abutment surface is concave. The sides of the projecting abutment member constitute chip deflectors. The projecting abutment member positioned so as to minimize adverse effects on chip development and evacuation.

In an attempt to minimize even further adverse effects of the abutment member on chip development and evacuation, there is disclosed in WO 2004/050283 a double-sided indexable tangential cutting insert similar to that disclosed in WO 03/101655 but with a differently formed abutment member. The form of the abutment member at each end of the cutting insert disclosed in WO 2004/050283 is such that in each cross section of the cutting insert taken in a plane parallel to the minor plane of the cutting insert, the abutment surface is closer to the median plane than to a respective leading section of a major cutting edge. Despite the improvement provided by this cutting insert, the abutment member still presents a chip deflector to chips which in certain circumstances may have an adverse effect on chip development and evacuation, depending on cutting conditions.

SUMMARY OF THE INVENTION

It is an object of the present invention to provide a double-sided indexable tangential cutting insert having four main cutting edges, for a given direction of rotation of the milling cutter, each main cutting edge having a positive axial rake angle when mounted as an operative cutting edge in a milling cutter. Preferably, such a double-sided indexable tangential cutting insert is capable of milling a square shoulder in a workpiece. It is a further object of the present invention to provide a milling cutter in which a cutting insert in according to the present invention can be retained.

The present invention is directed to a tangential cutting insert having two opposing end surfaces, each end surface having a generally rectangular shape in an end view of the cutting insert. Each end surface has four corners, two diagonally opposed lowered corners and two diagonally opposed raised corners, the lowered corners being closer to a median plane M of the cutting insert than the raised corners, the median plane M being located between the opposing end surfaces. A peripheral side surface extends between the two opposing end surfaces, the peripheral side surface comprising two opposing major side surfaces connected to two opposing minor side surfaces. A through bore extends between the major side surfaces and has a bore axis. A peripheral cutting edge is formed at the intersection of each end surface and the peripheral side surface, each peripheral cutting edge including major cutting edges formed at the intersection of the major side surfaces with an end surface. A major plane P2 is located between the major side surfaces and perpendicular to the median plane M, and a minor plane P1 is located between the minor side surfaces and is perpendicular to both the median plane M and the major plane P2.

In one aspect of the inventive cutting insert, each end surface comprises first and second abutment surfaces that are located on opposite sides of the minor plane P1, and are spaced apart from one another. The first abutment surface comprises a first abutment region that is on a first side of the major plane P2, and the second abutment surface comprises a second abutment region that is also on the first side of the major plane P2. In each cross-section of the cutting insert that (a) is taken in a plane parallel to the minor plane P1, and (b) passes through the first abutment region of a given end surface, the first abutment region slopes in a first direction relative to a plane M' parallel to the median plane M. And in each cross-section of the cutting insert that (a) is taken in a plane parallel to the minor plane P1, and (b) passes through the second abutment region of the given end surface, the second abutment region slopes in a second direction relative to said plane M', the second direction being opposite the first direction.

The first and second abutment regions may not protrude with respect to the surrounding end surface.

In each cross section of the cutting insert taken in a plane parallel to the minor plane P1, the end surface may have a smoothly varying profile.

Each end surface may further comprise: a third abutment region located on the same side of minor plane P1 as the first abutment region; and a fourth abutment region located on the same side of minor plane P1 as the second abutment region; the third and fourth abutment regions both being on a second side of major plane P2 and being spaced apart from one another.

All four abutment regions may be planar and none of the four abutment regions may be parallel to the median plane M. None of the four abutment regions may protrude relative to the surrounding end surface.

The third abutment region may be spaced apart from the first abutment region, and the fourth abutment region may be spaced apart from the second abutment region.

The cutting insert may be right-handed, left-handed or ambidextrous.

In another aspect of the inventive cutting insert, each end surface comprises first and second abutment surfaces that are located on opposite sides of the minor plane P1, and are spaced apart from one another. The first abutment surface comprises a first abutment region that is on a first side of the major plane P2, and the second abutment surface comprises a second abutment region that is also on the first side of the major plane P2. Neither of the first and second abutment regions protrudes relative to the surrounding end surface; and in each cross section of the cutting insert taken in a plane parallel to the minor plane P1, each end surface has a smoothly varying profile.

Each end surface may further comprise a third abutment region located on the same side of minor plane P1 as the first abutment region and a fourth abutment region located on the same side of minor plane P1 as the second abutment region, the third and fourth abutment regions both being on a second side of major plane P2 and being spaced apart from one another.

All four abutment regions may be planar and none of the four abutment regions may be parallel to the median plane M. None of the four abutment regions may protrude relative to the surrounding end surface.

In still another aspect, the present invention is directed to a milling cutter. The inventive milling cutter has a cutter body comprising at least one insert pocket having adjacent side and rear walls generally transverse to a pocket base, the side wall comprising an axial location surface, the rear wall being provided with two tangential location surfaces, a first tangential location surface being proximal the axial location surface and a second tangential location surface being distal the axial location surface. In addition, an inventive cutting insert is seated in the insert pocket.

The axial location surface may abut a minor side surface of the cutting insert and the two tangential location surfaces may abut first and second abutment regions formed on an end surface of the cutting insert. The first and second tangential location surfaces may be oppositely sloping.

The side wall and rear wall of the pocket base may form between them an obtuse angle.

BRIEF DESCRIPTION OF THE DRAWINGS

For a better understanding, the invention will now be described, by way of example only, with reference to the accompanying drawings in which.

DETAILED DESCRIPTION OF THE INVENTION

Figure 1:
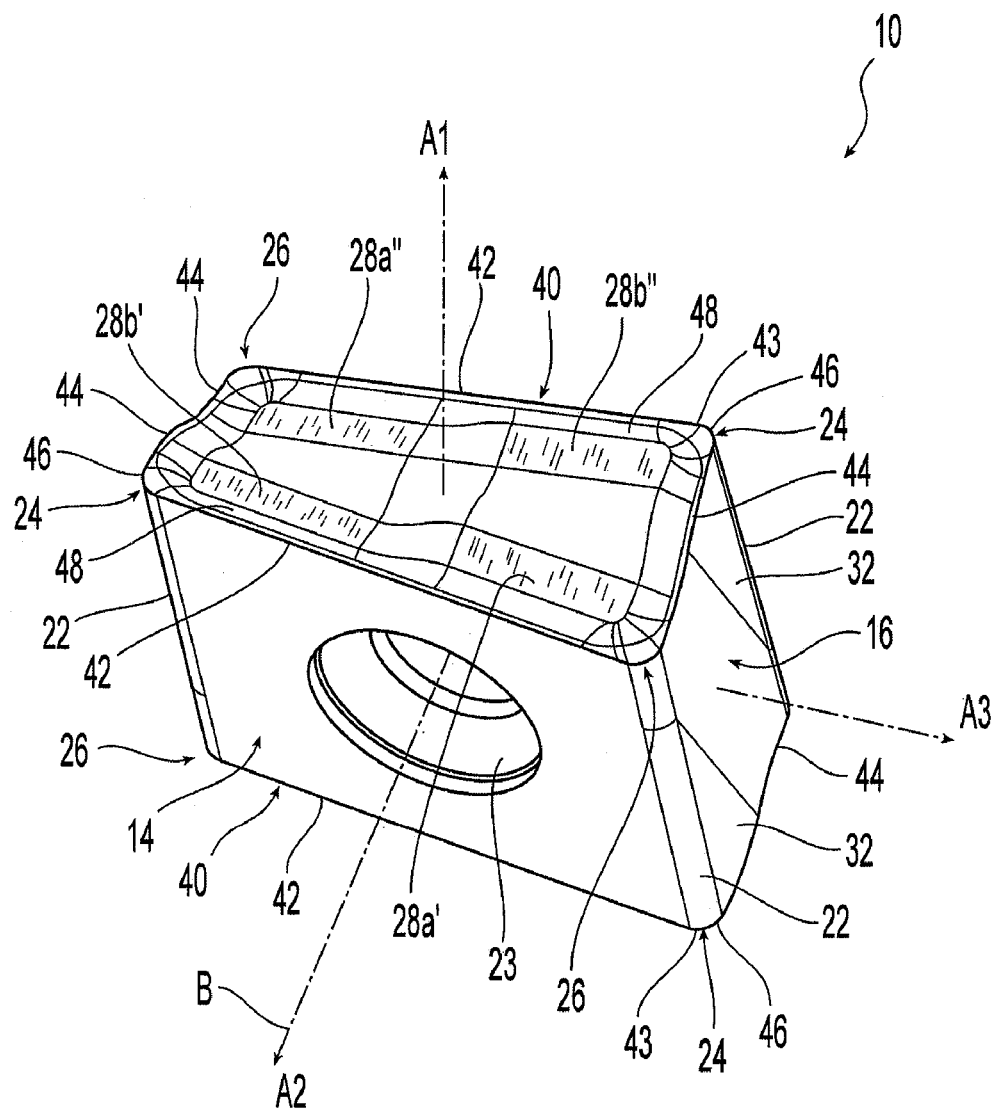
FIG. 1 is a perspective view of a right-handed cutting insert in accordance with the present invention.
Figure 2:
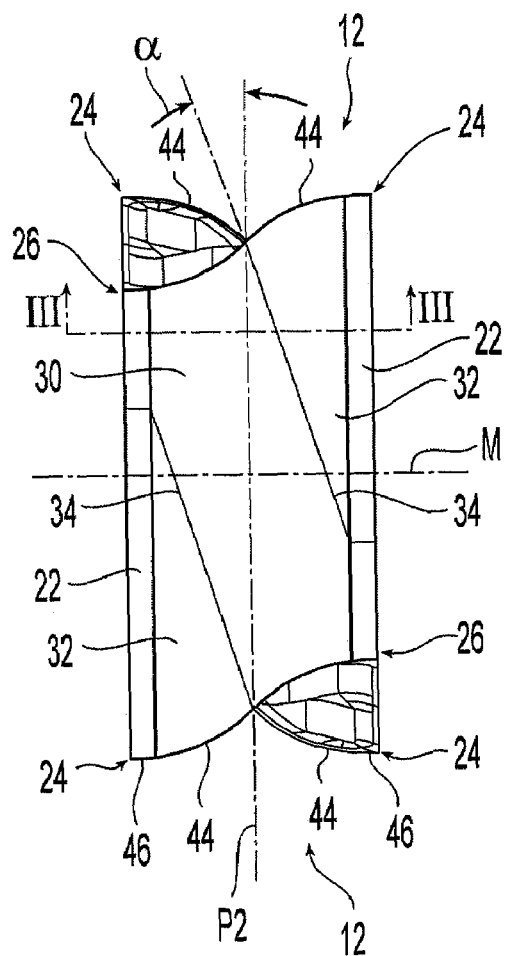
FIG. 2 is a first side view of the cutting insert in FIG. 1.
Figure 3:
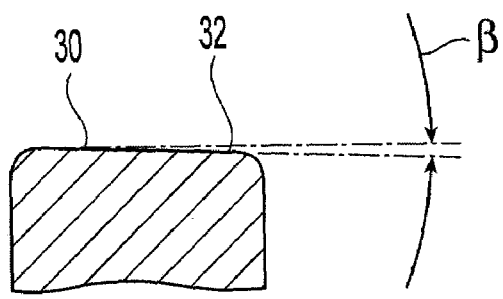
FIG. 3 is a cross-sectional view of the cutting insert taken along the line III-III in FIG. 2.
Figure 4:
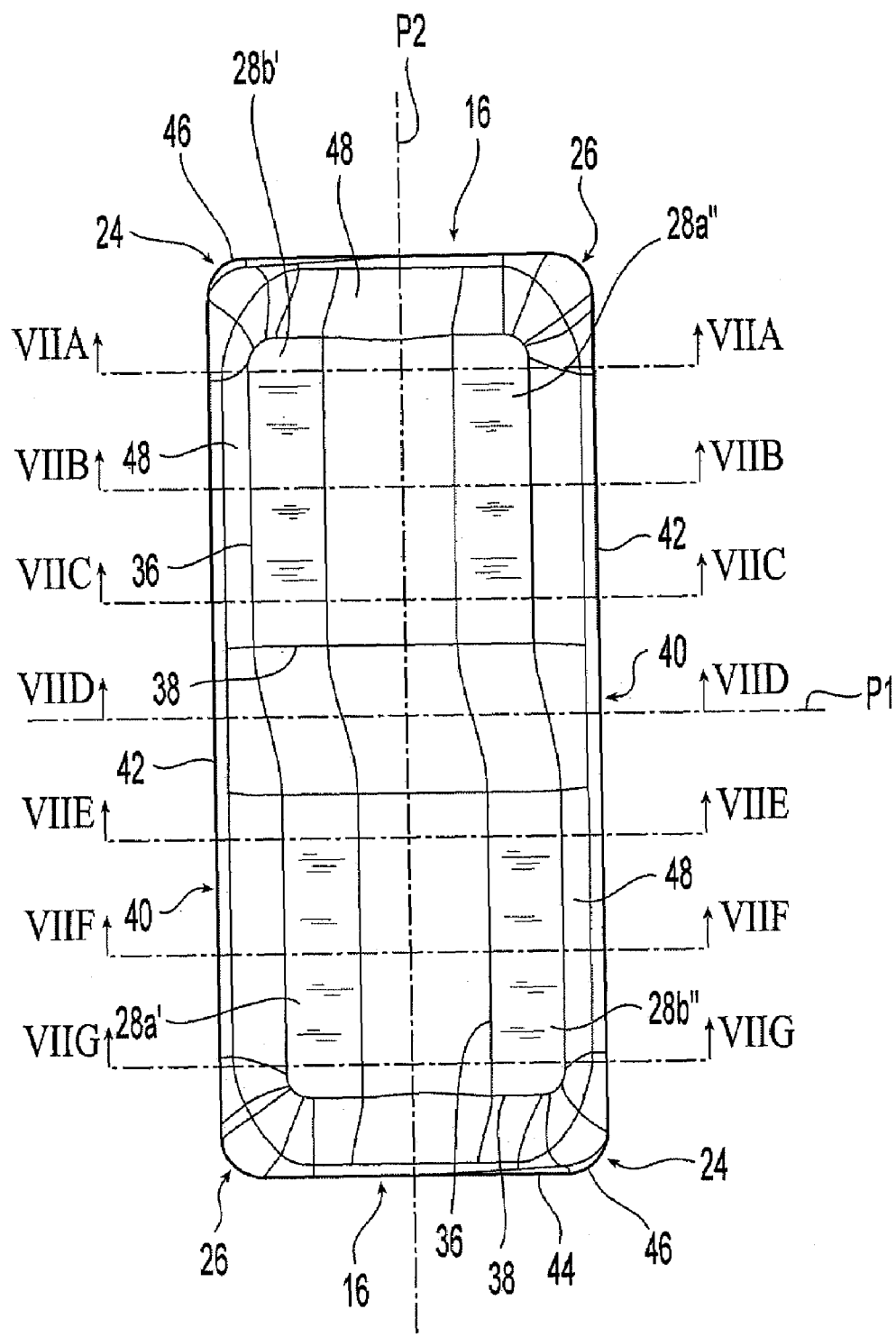
FIG. 4 is an enlarged end view of the cutting insert shown in FIG. 1.
Figure 5:
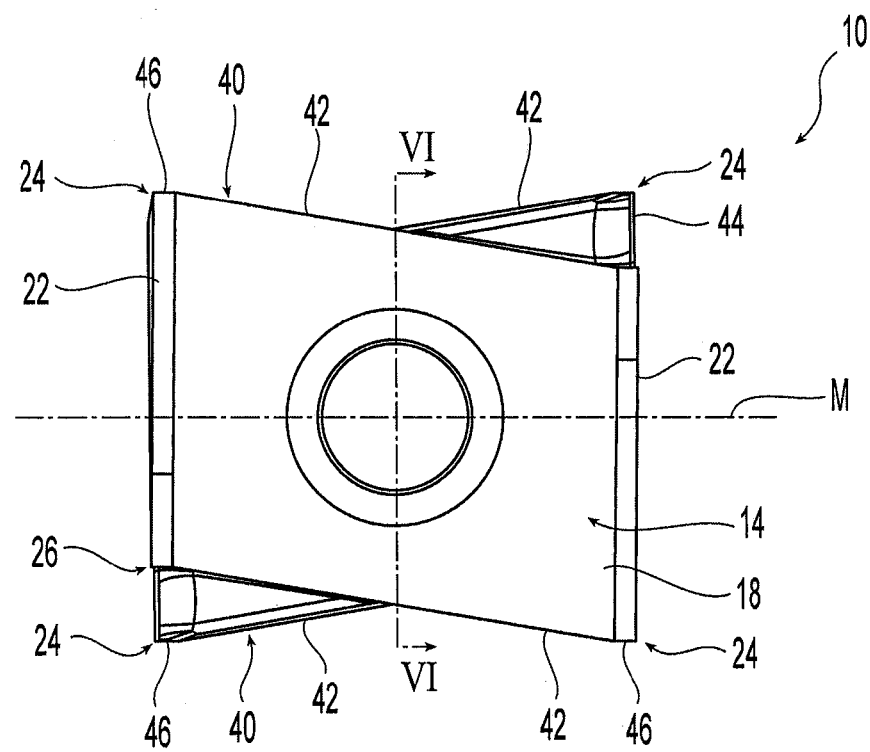
FIG. 5 is a second side view of the cutting insert shown in FIG. 1.
Figure 6:
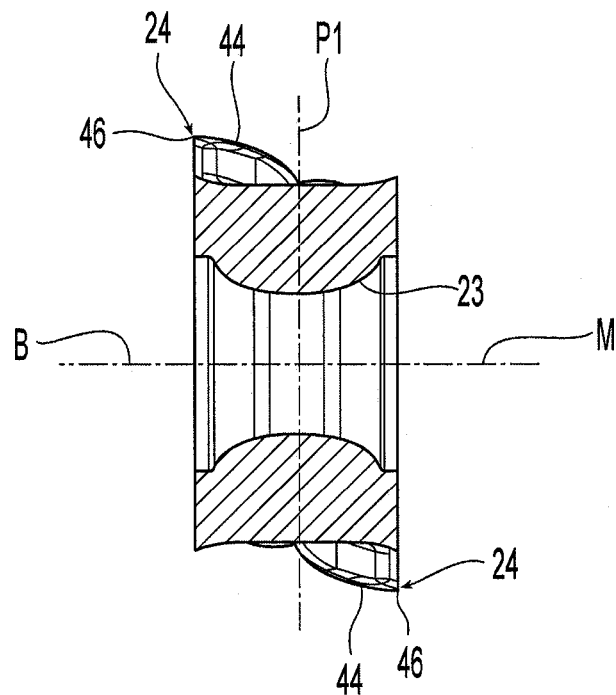
FIG. 6 is a cross-sectional view of the cutting insert taken along the line VI-VI in FIG. 5.
Figure 7A:
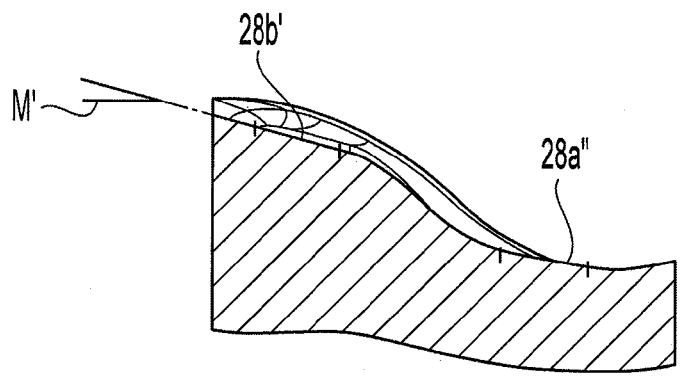
FIG. 7A is a partial cross-sectional view of the cutting insert taken along the line VIIA-VIIA in FIG. 4.
Figure 7B:
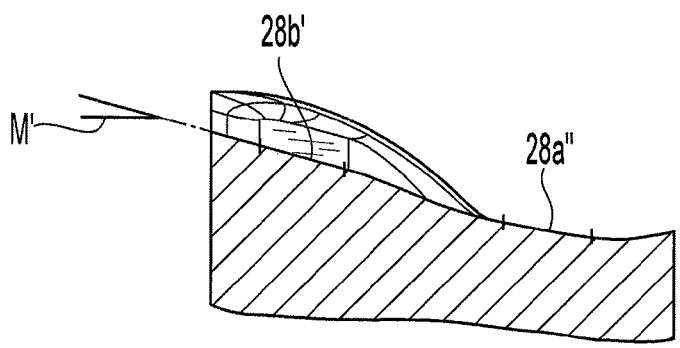
FIG. 7B is a partial cross-sectional view of the cutting insert taken along the line VIIB-VIIB in FIG. 4.
Figure 7C:
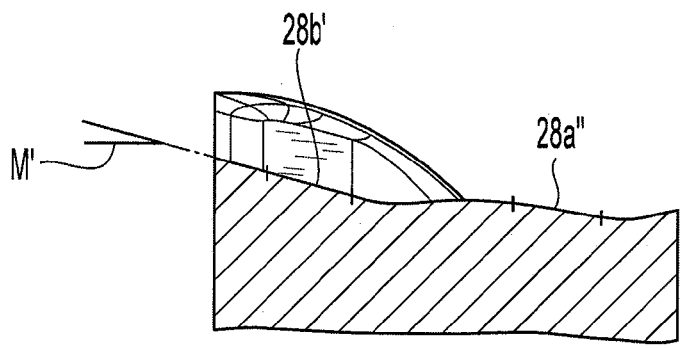
FIG. 7C is a partial cross-sectional view of the cutting insert taken along the line VIIC-VIIC in FIG. 4.
Figure 7D:
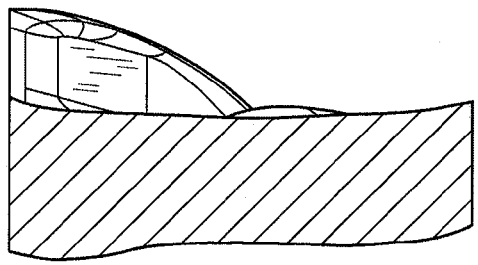
FIG. 7D is a partial cross-sectional view of the cutting insert taken along the line VIID-VIID in FIG. 4.
Figure 7E:
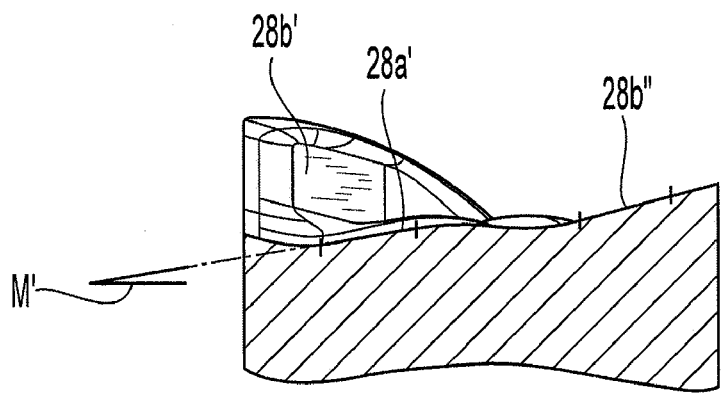
FIG. 7E is a partial cross-sectional view of the cutting insert taken along the line VIIE-VIIE in FIG. 4.
Figure 7F:
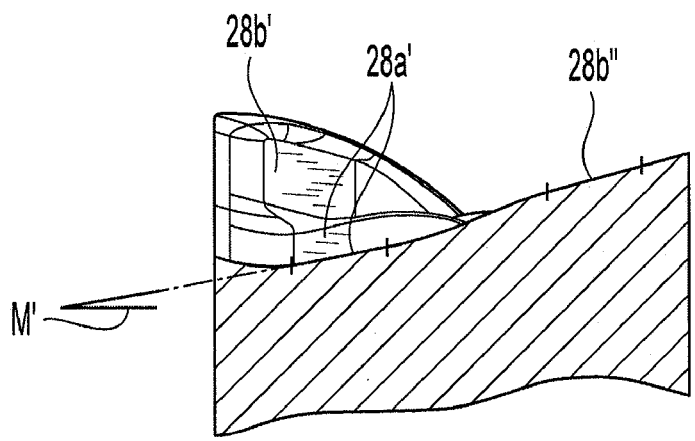
FIG. 7F is a partial cross-sectional view of the cutting insert taken along the line VIIF-VIIF in FIG. 4.
Figure 7G:
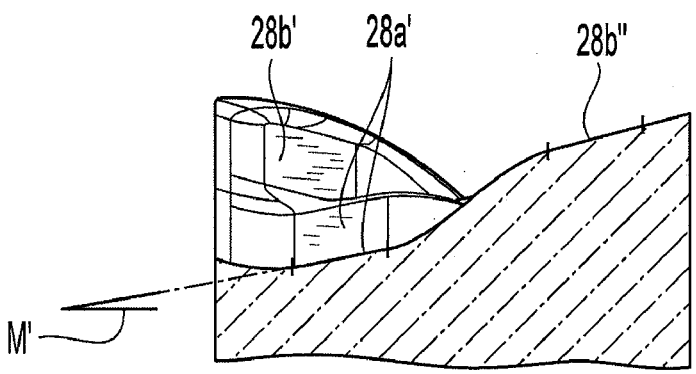
FIG. 7G is a partial cross-sectional view of the cutting insert taken along the line VIIG-VIIG in FIG. 4.

Attention is first drawn to FIGS. 1 to 6, showing a right-handed cutting insert 10 in accordance with the present invention there. It should be noted that the figures are not drawn to scale. For example, FIG. 4, has been drawn on a larger scale than the other figures, for reasons of clarity. The cutting insert 10 is tangential and indexable, and is typically manufactured by form-pressing and sintering carbide powders. The cutting insert 10 is generally rectangular in an end view and has two identical opposing end surfaces 12. Each end surface 12 has 180° rotational symmetry about a first axis A1 passing through the two end surfaces 12.

A peripheral side surface 14 extends between the two opposing end surfaces 12 and comprises two opposed identical minor side surfaces 16, two opposed identical major side surfaces 18, and four corner side surfaces 22. Each pair of adjacent minor and major side surfaces 16, 18 are connected at a common corner side surface 22. The two identical opposing major side surfaces 18 each have 180° rotational symmetry about a second axis A2 which is perpendicular to the first axis A1.

Similarly, the two identical opposing minor side surfaces 16 each have 180° rotational symmetry about a third axis A3 passing through the opposing minor side surfaces 16. The third axis A3 is perpendicular to the first axis A1 and to the second axis A2. A minor plane P1 of the cutting insert is defined by the first axis A1 and the second axis A2, a major plane P2 of the cutting insert 10 is defined by the first axis A1 and the third axis A3 and a median plane M is defined by the second axis A2 and the third axis A3.

The cutting insert is provided with a through bore 23 extending between the major side surfaces 18 and having a bore axis B coinciding with the second axis A2.

Each end surface 12 has four corners, two diagonally opposed raised corners 24 and two diagonally opposed lowered corners 26. The lowered corners 26 are closer to the median plane M than the raised corners 24. Each corner side surface 22 extends between a given raised corner 24 of one of the two opposing end surfaces 12 and a given lowered corner 26 of the other of one of the two opposing end surfaces 12. Each end surface 12 has four separate planar regions 28 (28a', 28b', 28a", 28b"). As will be discussed in greater detail below, the planar regions 28 constitute abutment surfaces for locating the cutting insert 10 in a milling cutter.

Each minor side surface 16 is divided into three minor side sub-surfaces comprising a central minor side sub-surface 30 bordered on either side by two outer minor side sub-surfaces 32. The central minor side sub-surface 30 and the outer minor side sub-surfaces 32 meet at a joins 34. The central minor side sub-surface 30 has a generally strip-like shape, is flat, parallel to the minor plane P1 and oriented at angle $\alpha$ with respect to the major plane P2 (see FIG. 2). The angle $\alpha$ is defined between one of the joins 34 and the major plane P2. The outer minor side sub-surfaces 32 are generally triangular in shape and are not located in the plane of the central minor side sub-surface 30, but are oriented at angle $\beta$ thereto (see FIG. 3). In accordance with a specific application of the present invention, the angle $\beta$ is approximately 3°.

Each planar region 28 is elongated in form having two long edges 36 extending between two short edges 38. Preferably, the two long edges are parallel to the major plane P2. The four planar regions 28 of each end surface 12 are arranged in pairs. One pair of planar regions 28a', 28b' being located on one side of the major plane P2 and the other pair of planar regions 28a", 28b" being located on the other side of the major plane P2. For a given pair of planar regions 28a', 28b' (28a", 28b") located on a given side of the major plane P2, one of the planar regions 28a' (28a") is located on one side of the minor plane P1 and the other planar region 28b' (28b") is located on the other side of the minor plane P1. It should be noted that for each pair of planar regions, one of the planar regions 28b', 28b" is located further from the major plane P2 than the other one 28a', 28a".

A peripheral cutting edge 40 is formed at the intersection of each end surface 12 and the peripheral side surface 14. For each end surface 12, the peripheral cutting edge 40 comprises two major cutting edges 42, formed by the intersection of the major side surfaces 18 with the end surface 12; two minor cutting edges 44, formed by the intersection of the minor side surfaces 16 with the end surface 12; and four corner cutting edges 46, formed by the intersection of the corner side surfaces 22 with the end surface 12. Adjacent the peripheral cutting edge 40 in the end surfaces 12 is a rake surface 48 along which chips, removed from a workpiece during a cutting operation, flow. The rake surface 48 extends from the peripheral cutting edge 40 inwardly over that region of the end surface 12 along which the chips flow. Therefore, the actual extent of the rake surface 48 is dependent on cutting conditions and on the material being milled. In general, for the major cutting edges 42, the rake surface 48 can extend from the cutting edge 42 to at least the major plane P2.

Reference is now made to FIGS. 7A to 7G. It can be seen that the planar regions 28 (28a', 28b', 28a", 28b"), which constitute abutment surfaces for supporting the cutting insert in an insert pocket of a milling tool, do not protrude with respect to the surrounding end surface 12. In each cross section of the cutting insert 10 taken in a plane parallel to the minor plane P1, the end surface 12, and consequently the rake surface 48, has a smoothly varying profile. This allows for good chip development thereby greatly reducing the adverse effects on chip development that non-smoothly varying profiles have. In the cross sections shown in the figures, the planar regions 28 (28a', 28b', 28a", 28b") become straight-line sections of the profiles.

It will be noted that for a given pair of planar regions 28a', 28b' located on one side of the major plane P2, a first of the planar regions 28a' slopes in one direction relative to a plane M' parallel to the median plane M, whereas the second planar region 28b' slopes in the opposite direction. In FIGS. 7A to 7G, the slopes relative to the plane M' parallel to the median plane M have been shown for one pair of planar regions 28a', 28b', however, the same property exists for the other pair of planar regions 28a", 28b", due to the symmetry of the cutting insert 10. Clearly, the above properties of the direction of slope of the planar regions can equivalently defined with respect to the median plane as they can for all planes parallel to the median plane. Alternatively, relative to a Cartesian coordinate system, and for a given pair of planar regions 28a', 28b', the slope of the profiles of a given end surface 12, is negative at the straight-line sections representing the first planar region 28a' and positive at the straight-line sections representing the second planar region 28b'.

Figure 8:
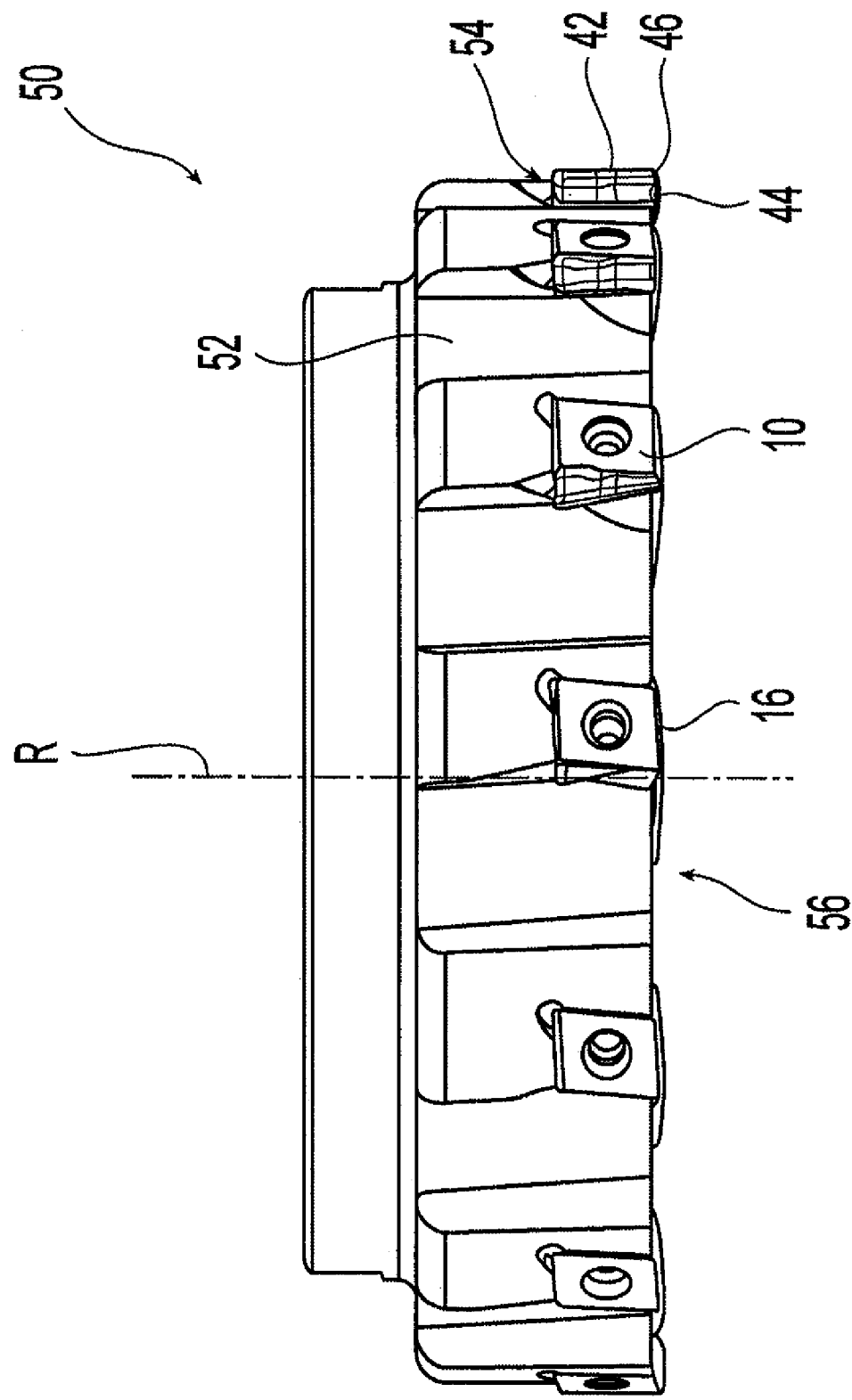
FIG. 8 is a perspective view of a milling cutter in accordance with the present invention.

Attention is now drawn to FIG. 8, showing a milling cutter 50 with an axis of rotation R, having a cutter body 52 provided with a plurality of right-handed insert pockets 54. In each insert pocket 54 a cutting insert 10 in accordance with the present invention is clamped by means of a clamping screw (not shown). As can be seen, each cutting insert is seated so that there will be a clearance between a workpiece (not shown) and the cutting insert's minor side surface 16 adjacent the milling cutter's face 56.

Figure 9:
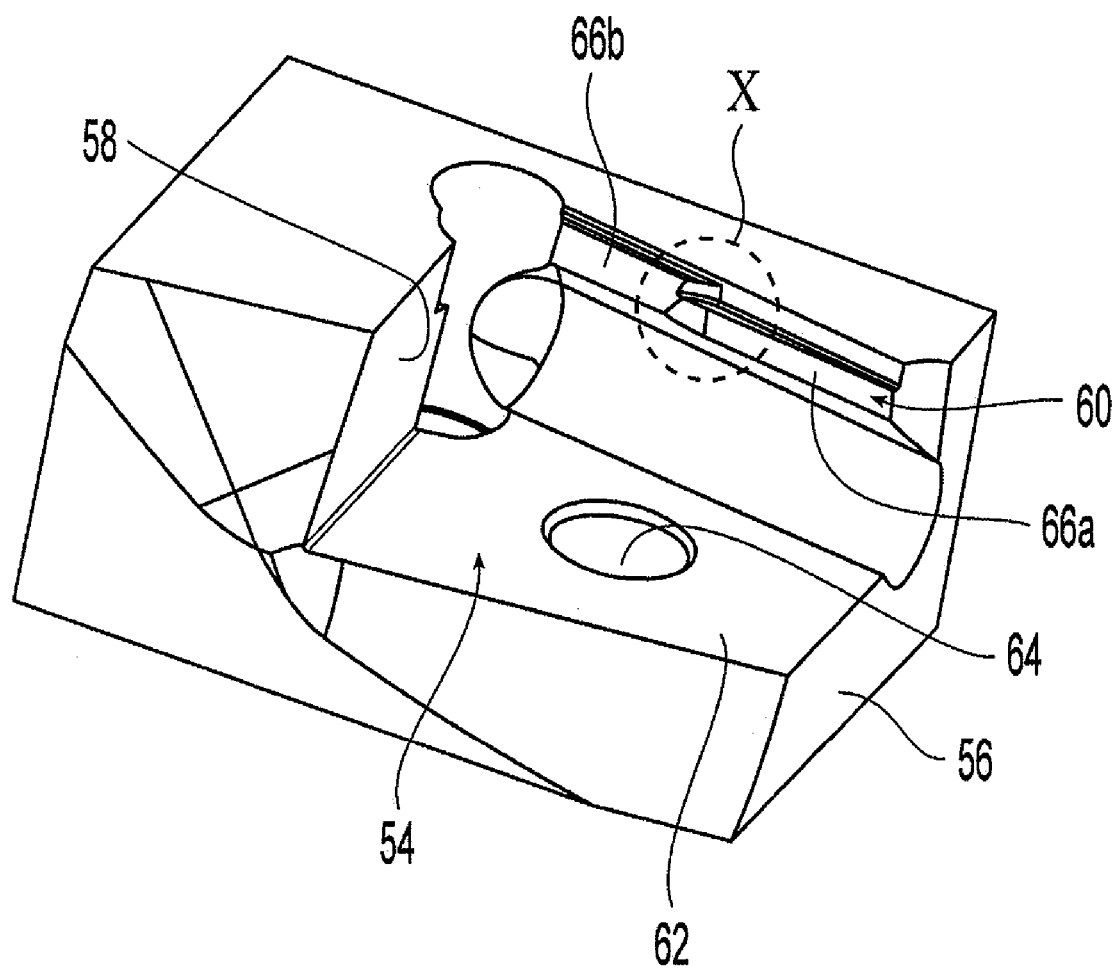
FIG. 9 is a perspective view of a portion of the cutter body of the milling cutter in accordance with the present invention, showing in detail a right-handed insert pocket.

The structure of the insert pocket 54 is shown in detail in FIG. 9. The insert pocket 54 comprises adjacent side and rear walls 58, 60 generally transverse to a base 62. The base 62 is provided with a threaded bore 64 for receiving the clamping screw in order to secure the cutting insert 10 in the insert pocket 54. When the cutting insert 10 is secured in the insert pocket 54, a radially inner major side surface abuts the base 62 of the insert pocket 54. The side wall 58 constitutes an axial location surface that abuts a given minor side surface 16 of the cutting insert 10 along the central minor side sub-surface 30. The fact that the outer minor side sub-surfaces 32 are not located in the plane of the central minor side sub-surface 30, but are oriented at angle thereto, ensures that the side wall 58 will abut the given minor side surface 16 along the central minor side sub-surface 30.

Figure 10:
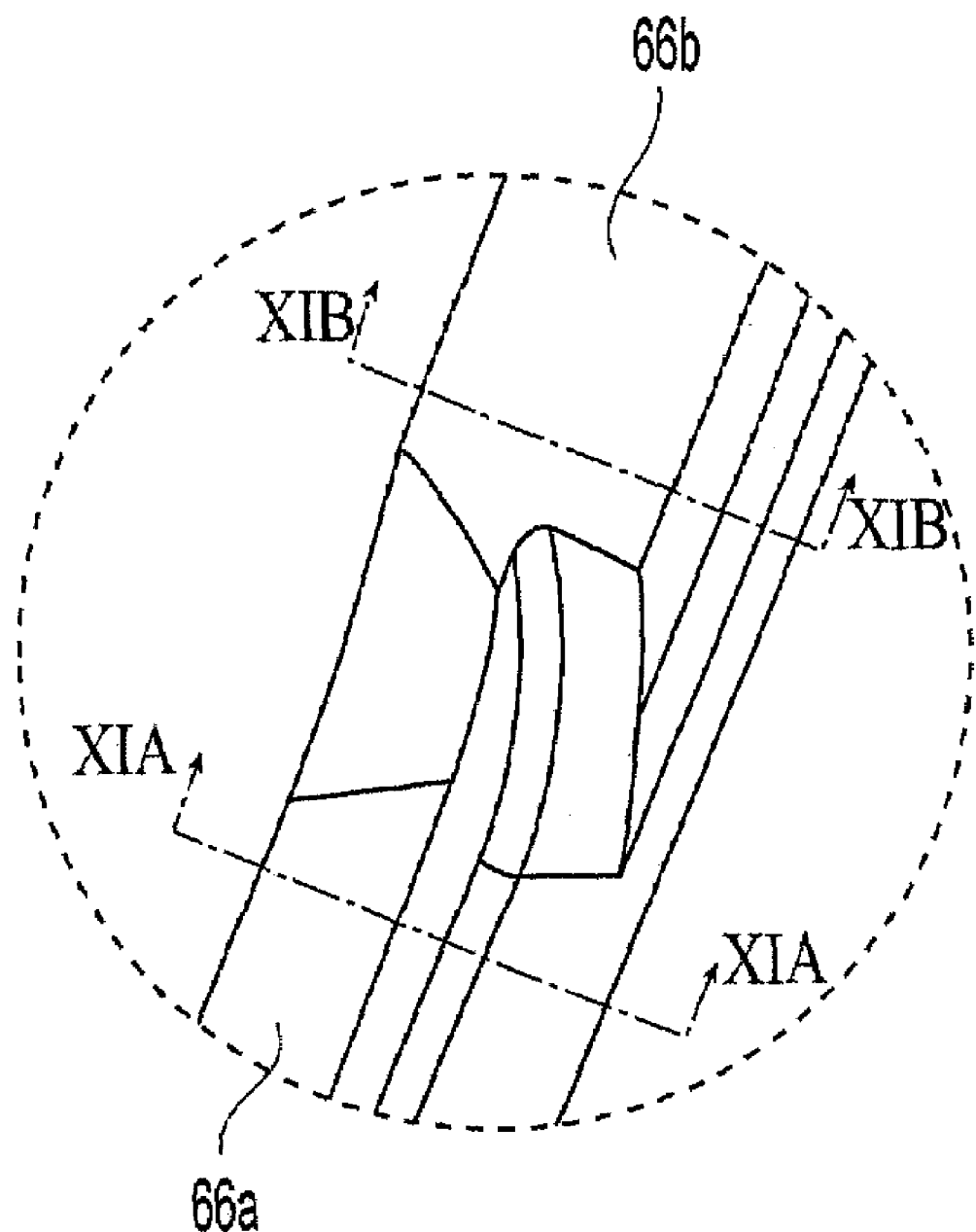
FIG. 10 is a detail of the insert pocket shown in FIG. 9.

The rear wall 60 is provided with two rectangular tangential location surfaces 66a, 66b, a outer tangential location surface 66a proximal the milling cutter's face 56, or equivalently, distal the side wall 58 (i.e., the axial location surface) and an inner tangential location surface 66b proximal side wall 58. The tangential location surfaces 66a, 66b are shown in greater detail in FIG. 10. The terms "inner" and "outer" are to be construed as relative to the side wall 58 of the insert receiving pocket 54.

Figure 11A:
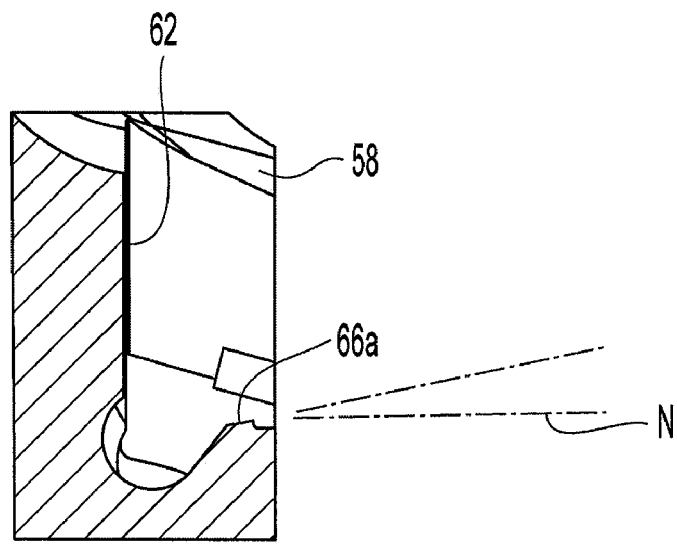
FIG. 11A is a partial cross-sectional view of the insert pocket taken along the line XIA-XIA in FIG. 10.
Figure 11B:
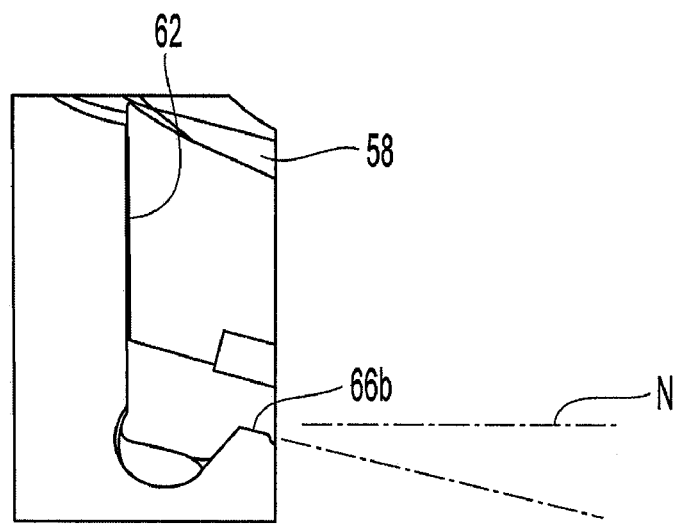
FIG. 11B is a partial cross-sectional view of the insert pocket taken along the line XIB-XIB in FIG. 10.

With reference to FIGS. 11a and 11b, it will be noted that the outer tangential location surface 66a slopes in one direction relative to a plane N perpendicular to the base 62, whereas the inner tangential location surface 66b slopes in the opposite direction.

The relative inclination of the outer and inner tangential location surfaces 66a, 66b to each other is similar to, or if desired equal to, the relative inclination of the pairs of planar regions 28a', 28b' (28a", 28b") of the end surfaces 12 of the cutting insert 10. When the cutting insert 10 is retained in the insert pocket 54, the outer and inner tangential location surfaces 66a, 66b abut a given pair of planar regions located to one side of the major plane P2. For, example, the outer tangential location surface 66a abuts one planar region 28a' of a given pair of planar regions 28a', 28b' (due to the similar, or equal, inclinations, the outer tangential location surface 66a and the one planar region 28a', will be almost, or completely, in full area contact with each other) and the inner tangential location surface 66b the other planar region 28b' of the given pair (again, the surfaces will be almost, or completely, in full area contact with each other).

This configuration of oppositely sloping planar regions of a given pair of planar regions 28a', 28b' (28a", 28b"), and the matching, or substantially matching, oppositely sloping tangential location surfaces 66a, 66b provides stable mounting of the cutting insert in the insert pocket, whilst incorporating the planar regions 28a', 28b', 28a", 28b", for abutment of the cutting insert, that do not protrude relative to the surrounding regions of the end surface thereby making possible a smoothly varying profile of the end surface, allowing for good chip development.

For the particular configuration described above, a given major, corner and minor cutting edge 42, 44, 46 of a given end surface 12 will be operative. By removing the cutting insert 10 from the insert pocket 54 and by rotating the cutting insert by 180° with respect to the axis A1 passing through the end surface 12, the non-operative major, corner and minor cutting edges 42, 44, 46 of the given end surface 12 will be brought into an operative position. In this case the outer and inner tangential location surfaces 66a, 66b will abut the other pair of planar regions 28a", 28b" of the given end surfaces 12. The opposing end surface may be brought into an operative working position by rotating the cutting insert by 180° about the axis A3 passing through the minor side surface 16.

Figure 12A:
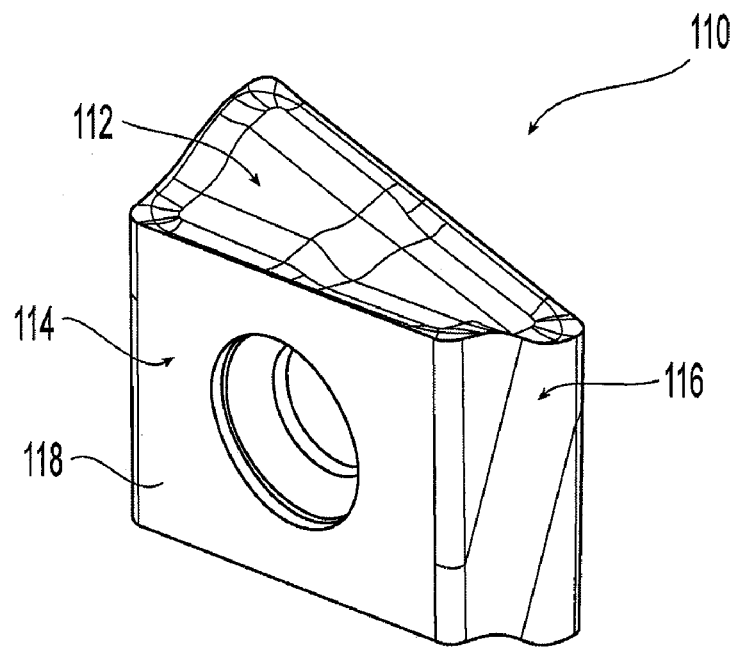
FIG. 12A is a perspective view of a left-handed cutting insert in accordance with the present invention.
Figure 12B:
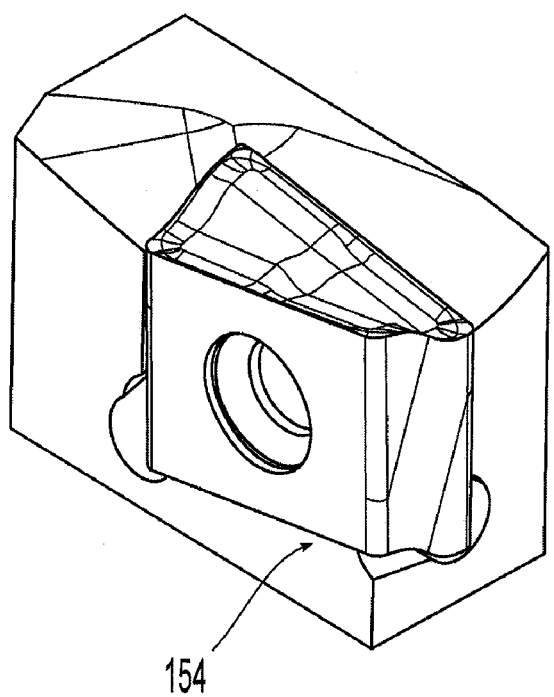
FIG. 12B is a perspective view of the left-handed cutting insert of FIG. 12A seated in left-handed insert pocket.

The foregoing description has been directed to a right-handed cutting insert. As seen in FIGS. 12A, 12B, 13A, 13B & 13C, it is also possible to create a left-handed cutting insert in accordance with the present invention. FIG. 12A shows a left-handed cutting insert 110 and FIG. 12B shows cutting insert 110 seated in left-handed insert pocket 154.

Figure 12C:
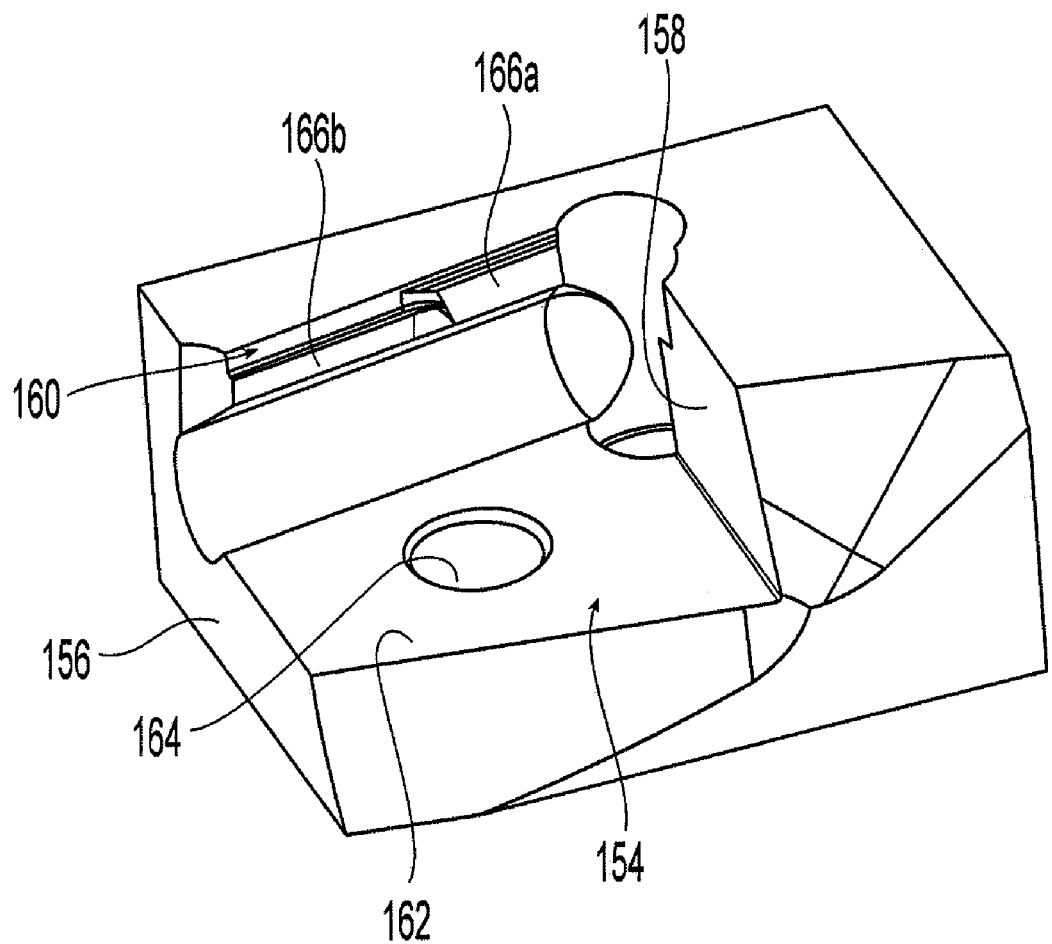
FIG. 12C is another perspective view of the left-handed insert pocket of FIG. 12B without the cutting insert seated therein.

Left-handed insert pocket 154 is a mirror image of right-handed insert pocket 54. As seen in FIG. 12C, the insert pocket 154 is formed in a milling cutter's face 156 and comprises a side wall 158, a rear wall 160 and a pocket base 162 in which a threaded bore 164 is formed. The rear wall 160 has an outer tangential location surface 166a and an inner tangential location surface 166b.

Left-handed cutting insert 110 is a mirror image of right-handed cutting insert 10. Accordingly, left-handed cutting insert 110 has top and bottom end surfaces 112, and a peripheral surface 114 comprising a pair a major side surfaces 118 and a pair of minor side surfaces 116. As seen in the end view of FIG. 13A, each end of the cutting insert 110 has a peripheral cutting edge 140 comprising a pair of major cutting edges 142 and a pair of minor cutting edges 144.

The end surface 112 of cutting insert 100 is provided with four planar regions 128a', 128a", 128b' and 128b". As in the right-handed cutting insert 10, a first pair of planar regions 128a' and 128b' are located on one side of a major plane P2 while a second pair of planar regions 128a" and 128b" are located on the other side of major plane P2. Furthermore, one member from each of these pairs (128a' and 128b") are located below a minor plane P1 while the other member from each pair (128a" and 128b') are located above the minor plane P1. However, in the case of the left-handed cutting insert 110, the pair 128a', 128a" that is further from the major plane P2 is opposite the pair 28b', 2b" that is further from the major plane P2 in the right-handed cutting insert 10 (compare FIG. 13A with FIG. 4).

And like the first-handed cutting insert 10, each end surface 112 of the left-handed cutting insert 110 also has four corners, two diagonally opposed raised corners 124 and two diagonally opposed lowered corners 126. As seen in FIG. 13C, the lowered corners 126 are closer to a median plane M of the left-handed cutting insert 110 than the raised corners 124.

Figure 13A:
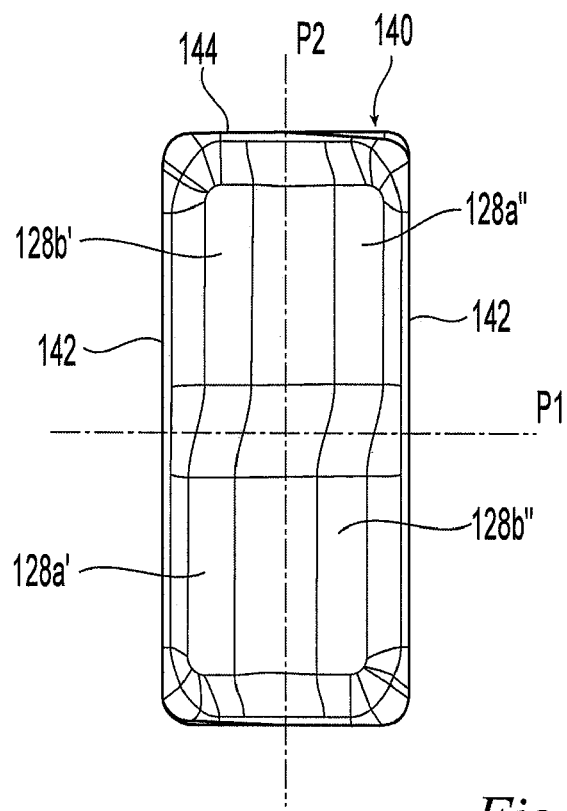
FIG. 13A is an end view of the left-handed cutting insert of FIG. 12A.
Figure 13B:
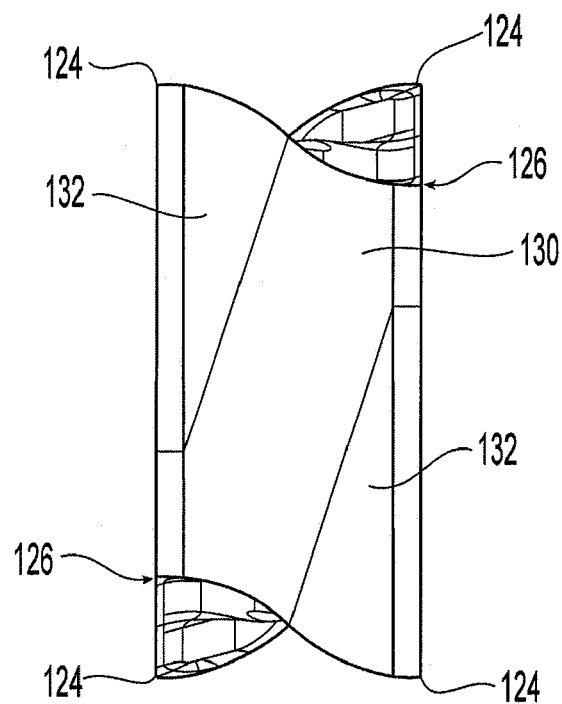
FIG. 13B is a first side view of the left-handed cutting insert of FIG. 12A.
Figure 13C:
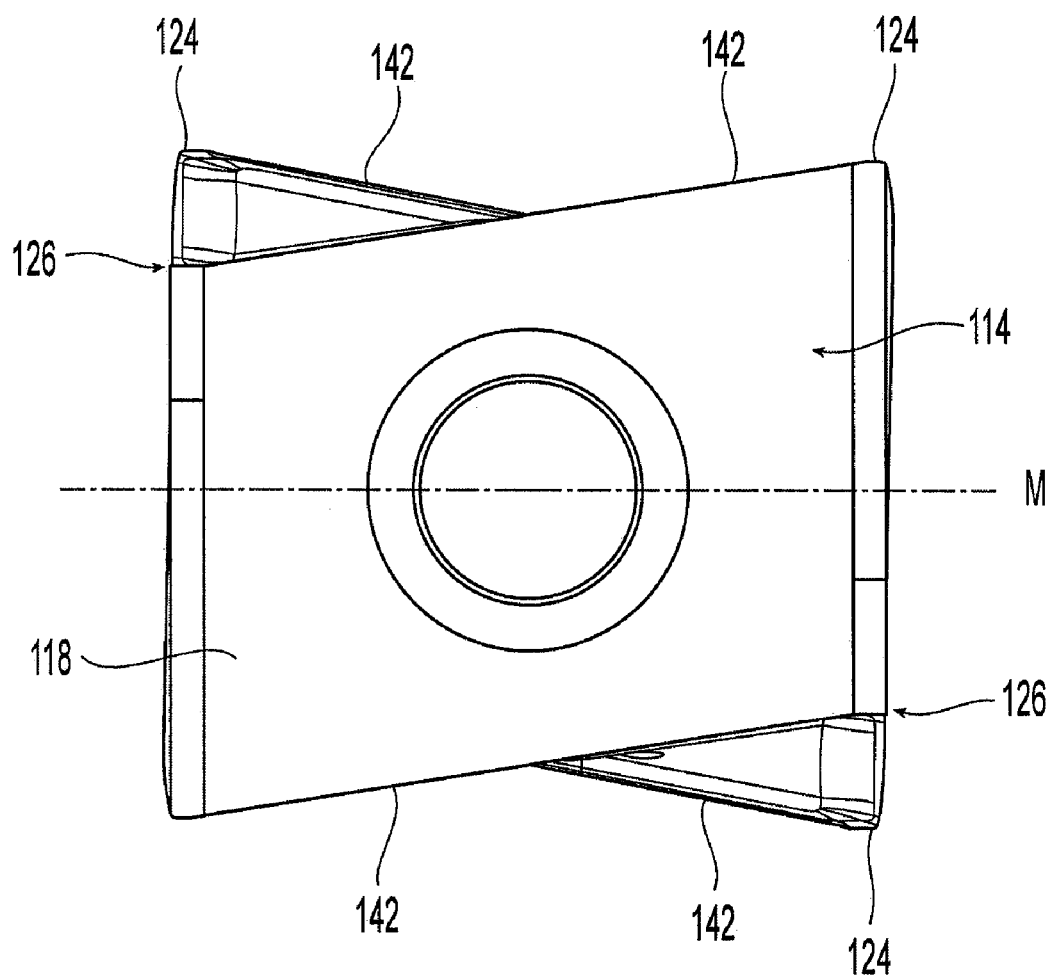
FIG. 13C is a second side view of the left-handed cutting insert of FIG. 12A.
Figure 14A:
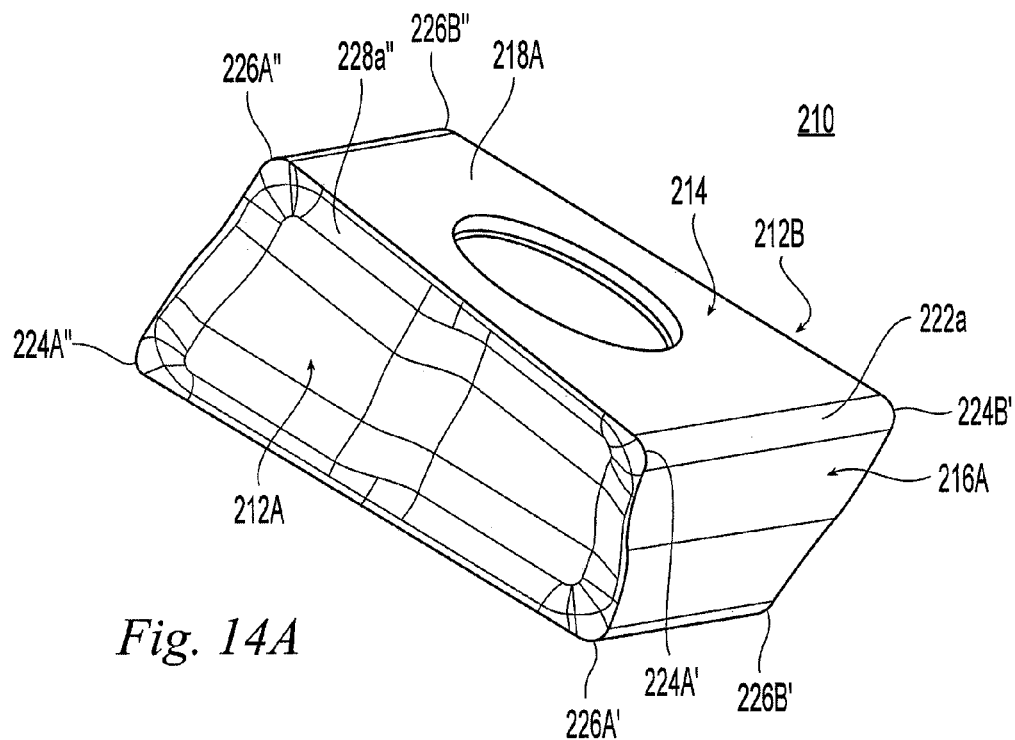
FIG. 14A is a perspective view of an ambidextrous cutting insert in accordance with the present invention showing a first end thereof.
Figure 14B:
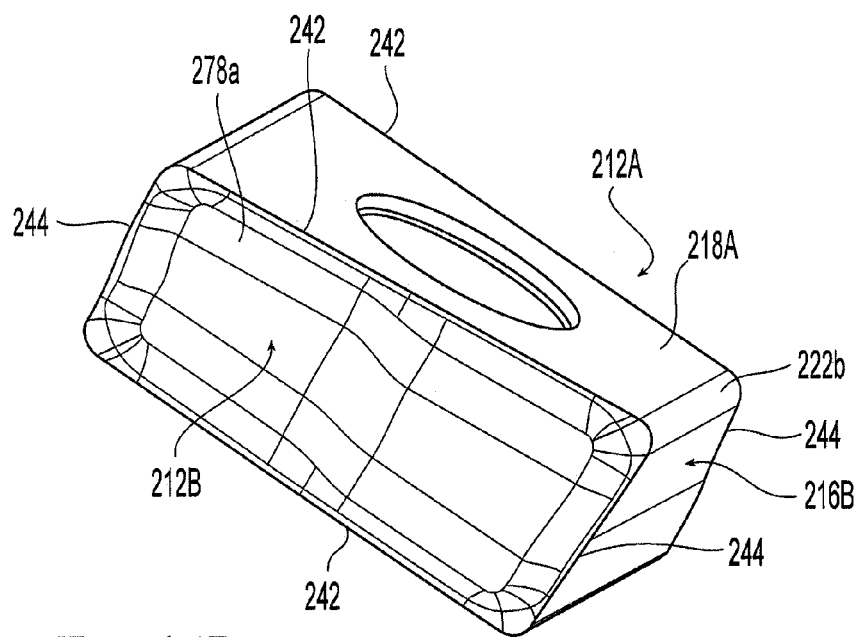
FIG. 14B is another perspective view of the ambidextrous cutting insert of FIG. 14A showing a second thereof.

Furthermore, as best seen in FIG. 13B, each minor side surface 116 comprises a central minor side-subsurface 130 bordered on either side by two outer minor side-subsurfaces 132. However, the side-subsurfaces 130, 132 of the left-handed cutting insert 110 are oriented in an opposite sense to that of the corresponding side-subsurfaces 30, 32 on right-handed cutting insert 10 (compare FIG. 13B with FIG. 2). Similarly, as seen in FIG. 13C, the major side surfaces 118 of the left-handed cutting insert 110 are oriented in an opposite sense to that of the corresponding major side surfaces 18 on right-handed cutting insert 10 (compare FIG. 13C with FIG. 5).

FIGS. 14-18 show an ambidextrous cutting insert 210 in accordance with the present invention. Unlike either the right- or left-handed cutting inserts 10, 110, respectively, the ambidextrous cutting insert 210 has two non-identical end surfaces 212a, 212b. A first end surface 212a appears the same as the end surface 12 of the right-handed cutting insert, while a second end surface 212B appears the same as the end surface 112 of the left-handed cutting insert. Like the left- and right-handed cutting inserts described above, the ambidextrous cutting insert is provided with major cutting edges 242 and minor cutting edges 244 formed between the intersection of a peripheral surface 214 and the end surfaces 212a, 212b.

Figure 16A:
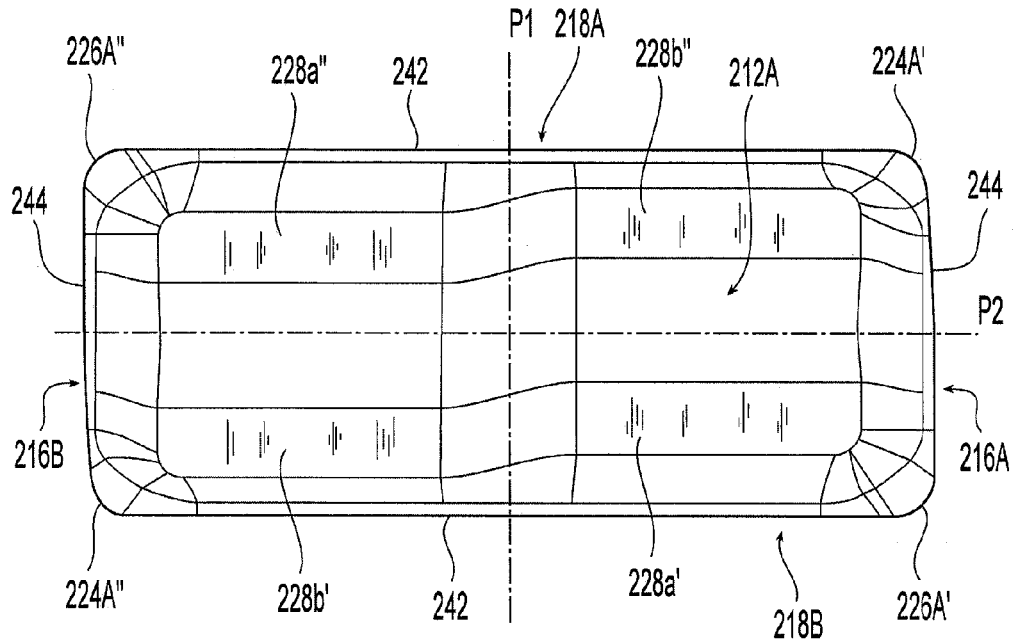
FIGS. 16A and 16B show plan views of the first end surface and the second end surface, respectively, of the ambidextrous cutting insert of FIGS. 14A and 14B.
Figure 16B:
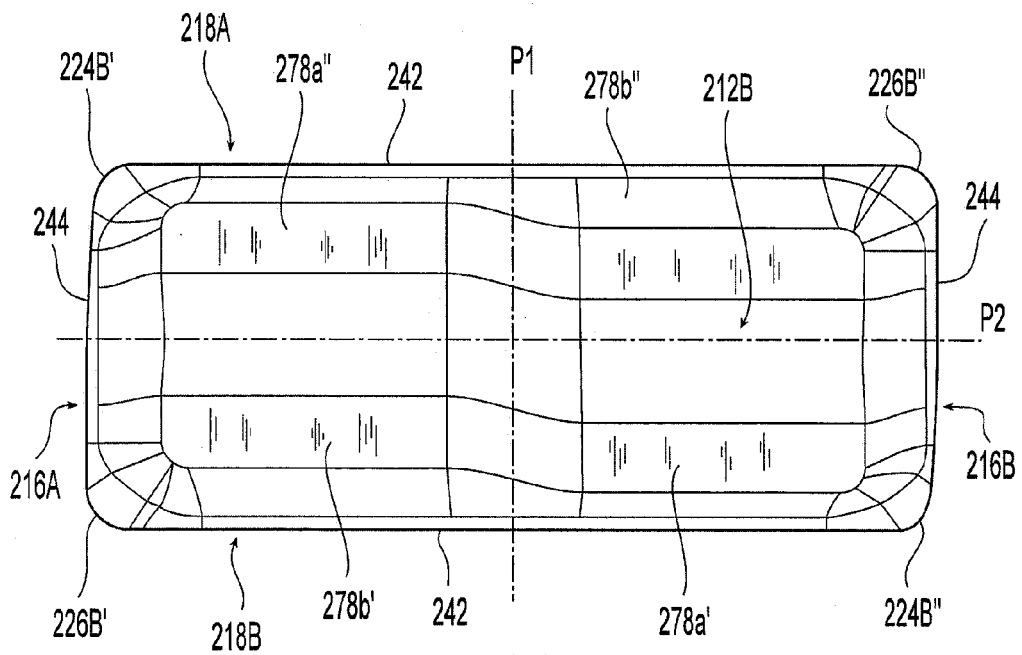

FIG. 16A shows first end surface 212a and FIG. 16B shows second end surface 212b. It is noted that in FIG. 16A, minor side surface 216a faces the right side of the page while in FIG. 16B, it faces the left side of the page. First end surface 212a has two raised corners 224a', 224a" and two lowered corners 226a', 226a", while second end surface 212b has two raised corners 224a', 224a" and two lowered corners 226a', 226a". As best seen in FIG. 16A, the first end surface 212a has four planar regions, 228a', 228b', 228a" and 228b". Similarly, as best seen in FIG. 16B, the second end surface 212a also has four planar regions, 278a', 278b', 278a" and 278b".

On each side surface, one pair of planar regions are formed on one side of major plane P2 while another pair is formed on the other side of major plane P2. Furthermore, one member of each such pair is formed on one side of minor plane P1 and the other member of each such pair is formed on the other side of minor plane P1.

Since the first end surface 212a is similar to the end surface 12 of the right handed cutting insert 10 and the second end surface 212b is similar to the end surface 112 of the left-handed cutting insert, it is understood that the relationships between the four abutment regions on either end surface relative to each other, and relative to the median plane M are analogous to those described above.

However, unlike either the right-handed or left-handed cutting inserts described above, in the ambidextrous cutting insert, positionally corresponding planar regions on the first 212a and second 212a end surfaces have different spacings relative to the major plane P2. For instance, planar region 228a" on the first end surface 212a is closer to the major plane P2 than is positionally corresponding planar region 278a" formed on the second end surface 212a.

Figure 15A:
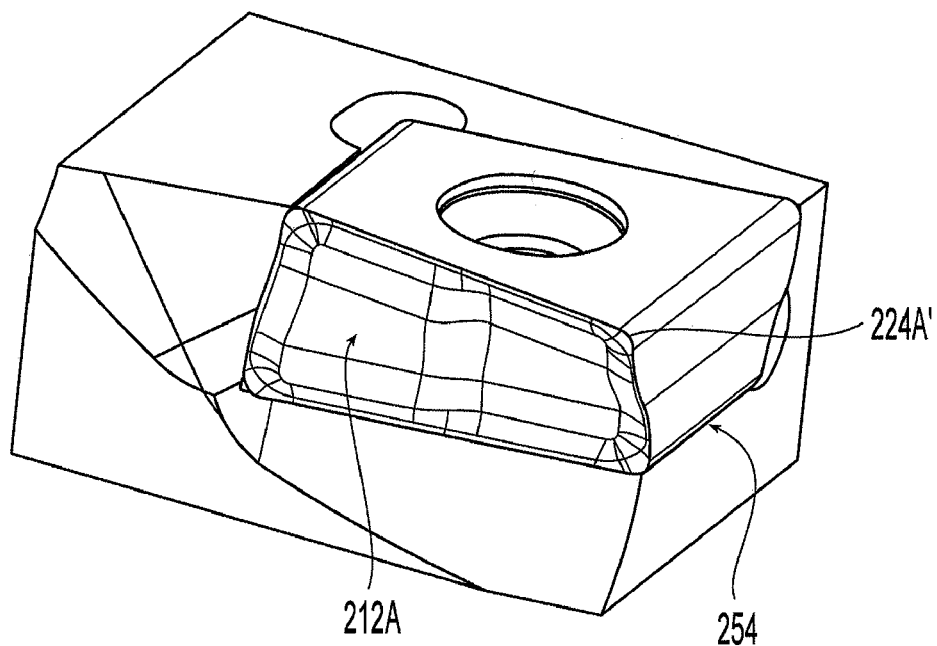
FIG. 15A shows the cutting insert of FIGS. 14A & 14B seated in an ambidextrous insert receiving pocket with an operative first end.
Figure 15B:
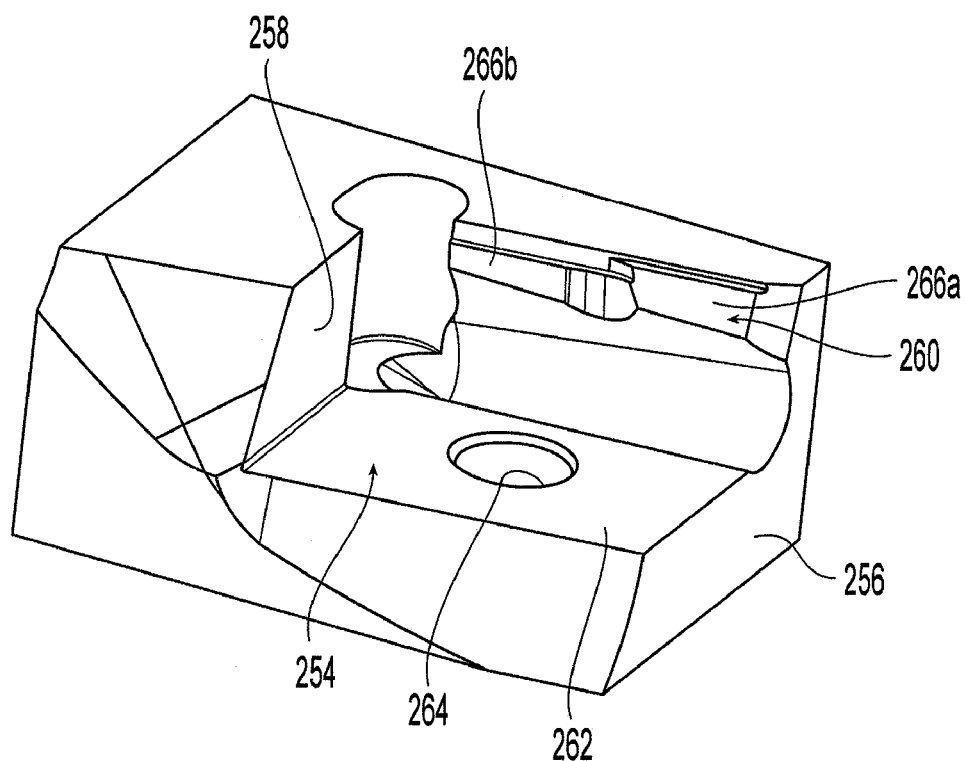
FIG. 15B shows the ambidextrous insert receiving pocket of FIG. 15A.

FIGS. 15A & 15B show an ambidextrous cutting insert 210 seated in an ambidextrous right-handed insert receiving pocket 254. In the present content, an 'ambidextrous right-handed insert receiving pocket' means that the pocket is suitable for receiving an ambidextrous cutting insert 210, the pocket itself suitable for placement or formation on a right-handed milling cutter or on the "right-hand side" of a slotting cutter having both right-handed and left-handed pockets suitable for receiving ambidextrous cutting inserts. It is therefore understood that one can form an ambidextrous left-handed insert receiving pocket that is a mirror image of the right-handed insert receiving pocket 254. Such an ambidextrous left-handed insert receiving pocket would thus be used either on a left-handed rotary milling cutter or on the "left-hand side" of a slotting cutter.

The ambidextrous right-handed insert receiving pocket includes adjacent side and rear walls 258, 260, respectively, that are generally traverse to a pocket base 262. The pocket base 262 is provided with a threaded bore 264 for receiving a clamping screw. As best seen in FIG. 17B, in the ambidextrous right-handed insert receiving pocket 254, the side wall 258 generally forms an obtuse angle β with the rear wall 260. This contrasts with the right-handed pocket 56 and the left-handed pocket 156, described above, where the side and real walls 58, 60 (or 158, 160) generally form an acute angle therebetween.

The rear wall 260 of the ambidextrous right-handed pocket 254 is provided with outer tangential abutment surface 266a and an inner tangential abutment surface 266b. Outer tangential abutment surface 266a is configured to abut planar regions 278a' or 278a" formed on second end surface 212b while inner tangential abutment surface 266b is configured to abut planar regions 278b', 278b" formed on second end surface 212b. Significantly, inner and outer tangential abutment surfaces 266a, 266b are not intended to abut any of planar regions 228a', 228a", 228b' 228b" formed on first end surface 212a.

As seen in FIGS. 17A, 17B, 18A and 18B, the peripheral side surface of the ambidextrous cutting insert 210 comprises a first minor side surface 216a, a second minor side surface 216b, a first major side surface 218a and a second major side surface 218b.

Figure 17A:
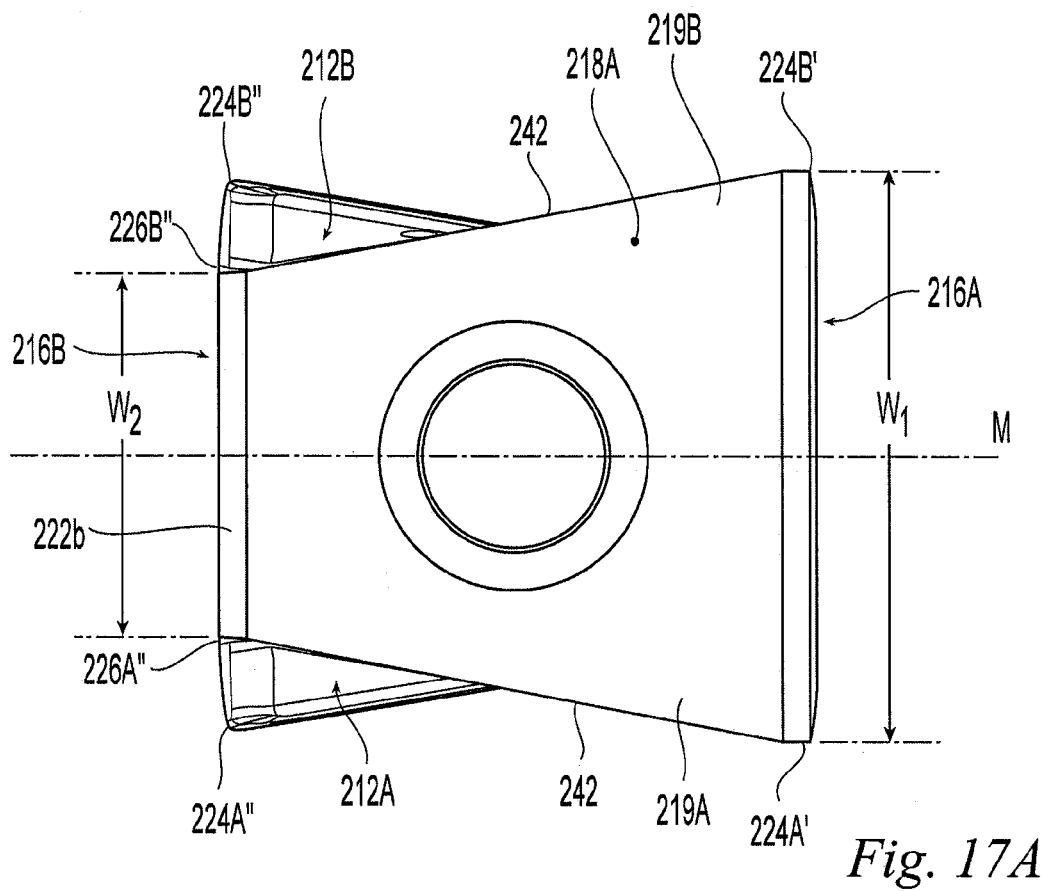
FIG. 17A shows a second side view of the cutting insert of FIGS. 14A and 14B, with the first end surface facing the bottom of the sheet.
Figure 17B:
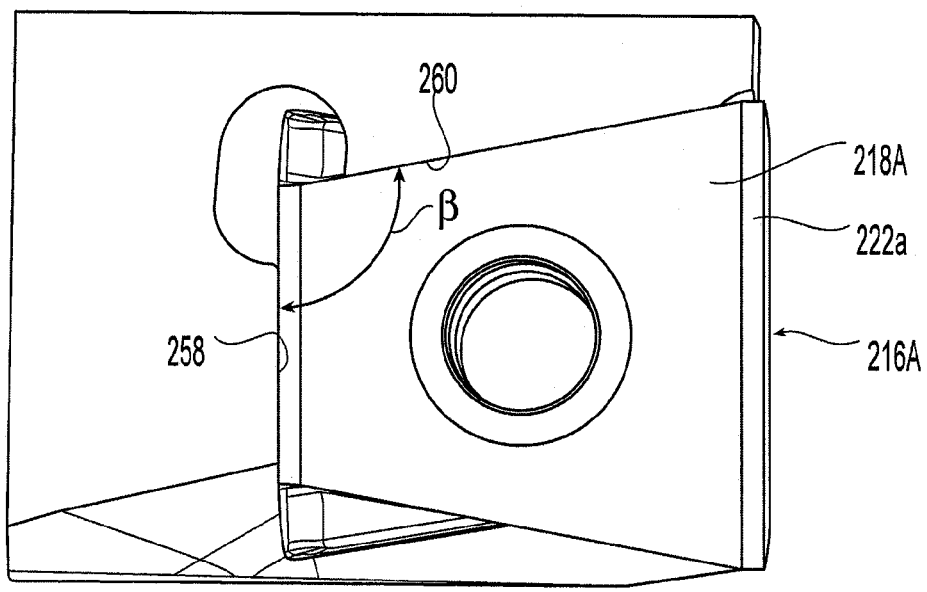
FIG. 17B shows the cutting insert in the orientation of FIG. 17A seated in the insert receiving pocket of FIG. 15A.

With reference to FIG. 17A, first major side surface 218a has mirror symmetry about a median plane M of the ambidextrous cutting insert 210, which bisects the first major side surface 218a into a first portion 219a associated with first end surface 212a, and a second portion 219b associated with second end surface 212b. First major side surface 218a has a generally trapezoidal shape with a wide end of width W1 proximate the first minor side surface 216a and a narrow end of width W2 proximate the second minor side surface 216b.

It is understood that the second major side surface 218b has a similar construction.

As seen in FIG. 17B, when cutting insert 210 is seated in an ambidextrous insert receiving pocket 254, the narrow end of the second major side surface 218b is adjacent the pocket base 262 at a point proximate the end face 256 (and thus distal the rear wall 258) of a rotary milling cutter in which the pocket 254 is formed.

Figure 18A:
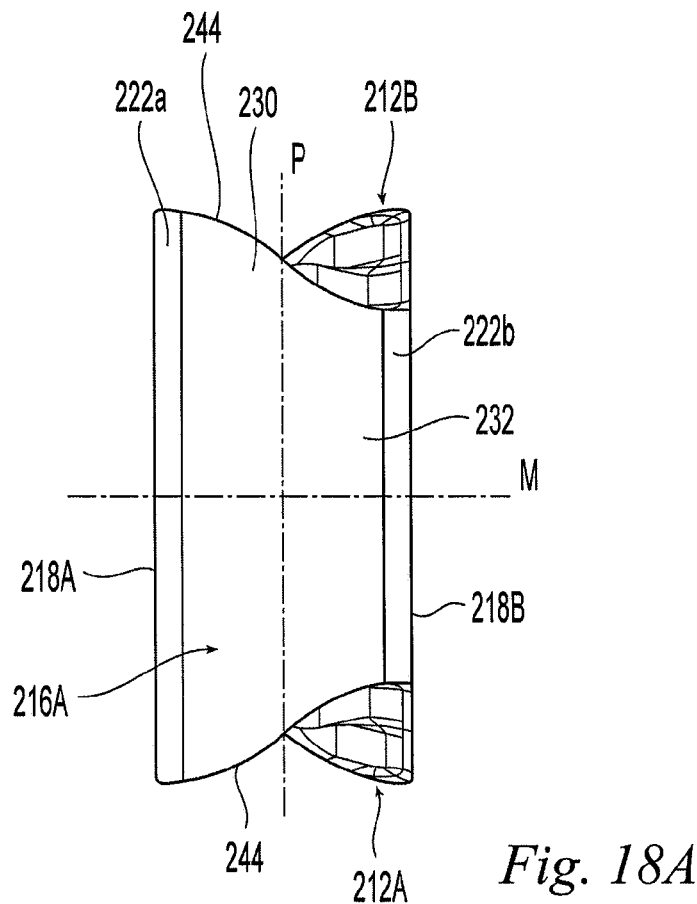
FIG. 18A shows a first side view of the cutting insert of FIGS. 14A and 14B, with the first end surface facing the bottom of the sheet.

As seen in FIG. 18A, first minor side surface 216a also has mirror symmetry about the median plane M, which bisects the first minor side surface 216a into a first portion 217a associated with the first end surface 212a, and a second portion 217b associated with second end surface 212b. First minor side surface 216a extends in a first direction along median plane M between first major side surface 216a and second major side surface 216b. First minor side surface 216a extends in a second direction along major plane P2 between oppositely directed the S-shaped minor cutting edges 244 belonging to opposing end surfaces 212a, 212b. Minor side surface 216a merges with adjacent first major side surface 218A at a major corner side surface 222a and merges with adjacent second major side surface 218B at minor corner side surface 222b. The minor side surface 216a further an abutment surface 230 adjacent the major corner side surface 222a and a non-abutting intermediate surface 232 between the abutment surface 230 and the minor corner side surface 222b. It is understood that the second minor side surface 216b is similarly constructed. Thus, the cutting insert 210 is provided with a pair of major corner side surfaces 222a at one set of diagonally opposite corners and a pair of minor corner side surfaces 222b at the other set of diagonally opposite corners, each of the four corner side surfaces extending between the non-identical end surfaces 212a, 212b.

Figure 18B:
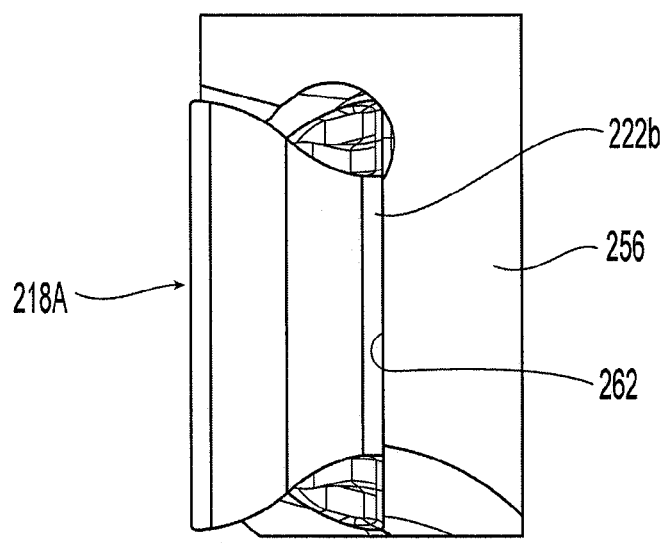
FIG. 18B shows the cutting insert in the orientation of FIG. 18A seated in the insert receiving pocket of FIG. 15A.

As seen in FIG. 18B, the minor corner side surface 222b associated with minor side surface 216a and major side surface 218b is adjacent the pocket base 262 at a point proximate the end face 256 (and thus distal the rear wall 258) of a slotting cutter in which the pocket 254 is formed.

Although the present invention has been described to a certain degree of particularity, it should be understood that various alterations and modifications could be made without departing from the scope of the invention as hereinafter claimed.

What is claimed is:

1. A tangential cutting insert, comprising:
   two opposing end surfaces, each end surface having a generally rectangular shape in an end view of the cutting insert;
   each end surface having four corners, two diagonally opposed lowered corners and two diagonally opposed raised corners, the lowered corners being closer to a median plane M of the cutting insert than the raised corners, the median plane M being located between the opposing end surfaces;
   a peripheral side surface extending between the two opposing end surfaces, the peripheral side surface comprising two opposing major side surfaces connected to two opposing minor side surfaces;
   a through bore extending between the major side surfaces and having a bore axis;
   a peripheral cutting edge formed at the intersection of each end surface and the peripheral side surface, each peripheral cutting edge including major cutting edges formed at the intersection of the major side surfaces with an end surface;
   a major plane P2 located between the major side surfaces and perpendicular to the median plane M;
   a minor plane P1 located between the minor side surfaces and perpendicular to both the median plane M and the major plane P2; wherein:
   each end surface comprises first and second abutment surfaces that: (a) are located on opposite sides of the minor plane P1, and (b) are spaced apart from one another;
   the first abutment surface comprises a first abutment region that is on a first side of the major plane P2;
   the second abutment surface comprises a second abutment region that is also on the first side of the major plane P2;
   in each cross-section of the cutting insert that (a) is taken in a plane parallel to the minor plane P1, and (b) passes through the first abutment region of a given end surface, the first abutment region slopes in a first direction relative to said major plane P2; and
   in each cross-section of the cutting insert that (a) is taken in a plane parallel to the minor plane P1, and (b) passes through the second abutment region of the given end surface, the second abutment region slopes in a second direction relative to said major plane P2, the second direction being opposite the first direction.

2. The tangential cutting insert according to claim 1, wherein the first and second abutment regions do not protrude with respect to the surrounding end surface.

3. The tangential cutting insert according to claim 1, wherein in each cross section of the cutting insert taken in a plane parallel to the minor plane P1, the end surface has a smoothly varying profile.

4. The tangential cutting insert according to claim 1, wherein each end surface further comprises:
   a third abutment region located on the same side of minor plane P1 as the first abutment region; and
   a fourth abutment region located on the same side of minor plane P1 as the second abutment region;
   the third and fourth abutment regions both being on a second side of major plane P2 and being spaced apart from one another.

5. The tangential cutting insert according to claim 4, wherein:
   all of the four abutment regions are planar, and
   none of the four abutment regions are parallel to the median plane M.

6. The tangential cutting insert according to claim 4, wherein none of the four abutment regions protrudes relative to the surrounding end surface.

7. The tangential cutting insert according to claim 4, wherein:
   the third abutment region is spaced apart from the first abutment region; and
   the fourth abutment region is spaced apart from the second abutment region.

8. The tangential cutting insert according to claim 1, wherein:
   the end surfaces are identical;
   the two major side surfaces are identical;
   the two minor side surfaces are identical; and
   the cutting insert is a right-handed cutting insert.

9. The tangential cutting insert according to claim 1, wherein:
   the end surfaces are identical;
   the two major side surfaces are identical;
   the two minor side surfaces are identical; and
   the cutting insert is a left-handed cutting insert.

10. The tangential cutting insert according to claim 1, wherein:
the end surfaces are non-identical; and
the cutting insert is an ambidextrous cutting insert.

11. A tangential cutting insert, comprising:
two opposing end surfaces, each end surface having a generally rectangular shape in an end view of the cutting insert;
each end surface having four corners, two diagonally opposed lowered corners and two diagonally opposed raised corners, the lowered corners being closer to a median plane M of the cutting insert than the raised corners, the median plane M being located between the opposing end surfaces;
a peripheral side surface extending between the two opposing end surfaces, the peripheral side surface comprising two opposing major side surfaces connected to two opposing minor side surfaces;
a through bore extending between the major side surfaces and having a bore axis;
a peripheral cutting edge formed at the intersection of each end surface and the peripheral side surface, each peripheral cutting edge including major cutting edges formed at the intersection of the major side surfaces with an end surface;
a major plane P2 located between the major side surfaces and perpendicular to the median plane M;
a minor plane P1 located between the minor side surfaces and perpendicular to both the median plane M and the major plane P2; wherein:
each end surface comprises first and second abutment surfaces that: (a) are located on opposite sides of the minor plane P1, and (b) are spaced apart from one another;
the first abutment surface comprises a first abutment region that is on a first side of the major plane P2;
the second abutment surface comprises a second abutment region that is also on the first side of the major plane P2;
neither of the first and second abutment regions protrudes relative to the surrounding end surface; and
in each cross section of the cutting insert taken in a plane parallel to the minor plane P1, each end surface has a smoothly varying profile.

12. The tangential cutting insert according to claim 11, wherein each end surface further comprises:
a third abutment region located on the same side of minor plane P1 as the first abutment region; and
a fourth abutment region located on the same side of minor plane P1 as the second abutment region;
the third and fourth abutment regions both being on a second side of major plane P2 and being spaced apart from one another.

13. The tangential cutting insert according to claim 12, wherein:
all of the four abutment regions are planar, and
none of the four abutment regions are parallel to the median plane M.

14. The tangential cutting insert according to claim 12, wherein:
the third abutment region is spaced apart from the first abutment region; and
the fourth abutment region is spaced apart from the second abutment region.

15. A milling cutter comprising:
a cutter body comprising at least one insert pocket having adjacent side and rear walls generally transverse to a pocket base, the side wall comprising an axial location surface, the rear wall being provided with two tangential location surfaces, a first tangential location surface being proximal the axial location surface and a second tangential location surface being distal the axial location surface;
a tangential cutting insert seated in the at least one insert pocket, the tangential cutting insert comprising:
two opposing end surfaces, each end surface having a generally rectangular shape in an end view of the cutting insert;
each end surface having four corners, two diagonally opposed lowered corners and two diagonally opposed raised corners, the lowered corners being closer to a median plane M of the cutting insert than the raised corners, the median plane M being located between the opposing end surfaces;
a peripheral side surface extending between the two opposing end surfaces, the peripheral side surface comprising two opposing major side surfaces connected to two opposing minor side surfaces;
a through bore extending between the major side surfaces and having a bore axis;
a peripheral cutting edge formed at the intersection of each end surface and the peripheral side surface, each peripheral cutting edge including major cutting edges formed at the intersection of the major side surfaces with an end surface;
a major plane P2 located between the major side surfaces and perpendicular to the median plane M;
a minor plane P1 located between the minor side surfaces and perpendicular to both the median plane M and the major plane P2; wherein:
each end surface comprises first and second abutment surfaces that: (a) are located on opposite sides of the minor plane P1, and (b) are spaced apart from one another;
the first abutment surface comprises a first abutment region that is on a first side of the major plane P2;
the second abutment surface comprises a second abutment region that is also on the first side of the major plane P2;
in each cross-section of the cutting insert that (a) is taken in a plane parallel to the minor plane P1, and (b) passes through the first abutment region of a given end surface, the first abutment region slopes in a first direction relative to said major plane P2; and
in each cross-section of the cutting insert that (a) is taken in a plane parallel to the minor plane P1, and (b) passes through the second abutment region of the given end surface, the second abutment region slopes in a second direction relative to said major plane P2, the second direction being opposite the first direction.

16. The milling cutter according claim 15, wherein:
the axial location surface abuts a minor side surface of the cutting insert, and
the two tangential location surfaces abut first and second abutment regions formed on an end surface of the cutting insert.

17. The milling cutter according to claim 16, wherein the first and second tangential location surfaces are oppositely sloping.

18. The milling cutter according to claim 15, wherein the side wall and rear wall of the pocket base form between them an obtuse angle.

19. A milling cutter comprising:
a cutter body comprising at least one insert pocket having adjacent side and rear walls generally transverse to a pocket base, the side wall comprising an axial location surface, the rear wall being provided with two tangential location surfaces, a first tangential location surface being proximal the axial location surface and a second tangential location surface being distal the axial location surface;

a tangential cutting insert seated in the at least one insert pocket, the tangential insert comprising:

two opposing end surfaces, each end surface having a generally rectangular shape in an end view of the cutting insert;

each end surface having four corners, two diagonally opposed lowered corners and two diagonally opposed raised corners, the lowered corners being closer to a median plane M of the cutting insert than the raised corners, the median plane M being located between the opposing end surfaces;

a peripheral side surface extending between the two opposing end surfaces, the peripheral side surface comprising two opposing major side surfaces connected to two opposing minor side surfaces;

a through bore extending between the major side surfaces and having a bore axis;

a peripheral cutting edge formed at the intersection of each end surface and the peripheral side surface, each peripheral cutting edge including major cutting edges formed at the intersection of the major side surfaces with an end surface;

a major plane P2 located between the major side surfaces and perpendicular to the median plane M;

a minor plane P1 located between the minor side surfaces and perpendicular to both the median plane M and the major plane P2; wherein:

each end surface comprises first and second abutment surfaces that: (a) are located on opposite sides of the minor plane P1, and (b) are spaced apart from one another;

the first abutment surface comprises a first abutment region that is on a first side of the major plane P2;

the second abutment surface comprises a second abutment region that is also on the first side of the major plane P2;

neither of the first and second abutment regions protrudes relative to the surrounding end surface; and in each cross section of the cutting insert taken in a plane parallel to the minor plane P1, each end surface has a smoothly varying profile.

20. The milling cutter according claim 19, wherein:

the axial location surface abuts a minor side surface of the cutting insert, and the two tangential location surfaces abut first and second abutment regions formed on an end surface of the cutting insert.

21. The milling cutter according to claim 20, wherein the first and second tangential location surfaces are oppositely sloping.

22. The milling cutter according to claim 19, wherein the side wall and rear wall of the pocket base form between them an obtuse angle.

* * * * *